United States Patent
Manda et al.

(10) Patent No.: US 7,364,131 B2
(45) Date of Patent: Apr. 29, 2008

(54) NON-RETURN VALVE FOR USE IN A MOLDING SYSTEM

(75) Inventors: Jan M. Manda, Toronto (CA); Sean Weir, Toronto (CA); Pierre Jean Pinet, Toronto (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 164 days.

(21) Appl. No.: 11/062,020

(22) Filed: Feb. 18, 2005

(65) Prior Publication Data

US 2005/0233020 A1   Oct. 20, 2005

(30) Foreign Application Priority Data

Apr. 5, 2004   (CA) .................................. 2463281

(51) Int. Cl.
*F16K 47/00*   (2006.01)
*F16L 55/02*   (2006.01)

(52) U.S. Cl. .................. 251/121; 137/614.16; 425/557; 425/559

(58) Field of Classification Search ................ 251/120, 251/121; 137/614.16; 164/312; 425/557, 425/559

See application file for complete search history.

(56) References Cited

U.S. PATENT DOCUMENTS

| | | | |
|---|---|---|---|
| 3,438,393 A | 4/1969 | Godley, II | |
| 4,377,180 A | 3/1983 | Biljes | |
| 4,643,665 A | 2/1987 | Zeiger | |
| 4,850,851 A | 7/1989 | Dinerman | |
| 5,040,589 A | 8/1991 | Bradley | |
| 5,044,926 A | 9/1991 | Dinerman et al. | |
| 5,151,282 A | 9/1992 | Dray | |
| 5,258,158 A | 11/1993 | Dray | |
| 5,401,161 A | 3/1995 | Long | |

(Continued)

FOREIGN PATENT DOCUMENTS

DE   3240872 A1   5/1984

(Continued)

OTHER PUBLICATIONS

Database WPI Week 199239 Derwent Publications Ltd. London, GB; AN 1992-322304 & SU 1 689 097 A1 (Termoplastovatomat Prodn Assoc) Nov. 7, 1991 Abstract; figures 1,2.

*Primary Examiner*—John K. Fristoe, Jr.

(57) ABSTRACT

The present invention relates to a non-return valve that can be configured for use anywhere along a molding material flow path in a molding system. The non-return valve of the present invention includes an improved means to restrict the backflow of melt therethrough during injection. In particular, a spigot-seal is configurable, during injection, between overlapping, closely-spaced, and mutually parallel complementary male and female spigot portions that are configured between complementary valve members. The spigot-seal advantageously maintains an effective backflow restriction even in the eventuality of transient movement between the spigot portions during injection. Preferably, the non-return valve of the present invention is also configured to include a means for mutually aligning and/or guiding the complementary valve components that ensures a proper alignment between the complementary spigot portions, and may also serve to improve the function and longevity of a face-seal, when present. The non-return valve of the present invention provides particularly advantageous utility when configured for use in a barrel assembly of an injection unit for the injection molding of a metal alloy.

24 Claims, 27 Drawing Sheets

U.S. PATENT DOCUMENTS

| | | |
|---|---|---|
| 5,441,400 A | 8/1995 | Zeiger |
| 5,470,514 A | 11/1995 | Dray |
| 5,518,394 A * | 5/1996 | Shiozawa et al. ........... 425/562 |
| 5,680,894 A | 10/1997 | Kilbert |
| 5,945,141 A * | 8/1999 | Shirota et al. .............. 425/563 |
| 6,007,322 A | 12/1999 | Suumen et al. |
| 6,227,841 B1 | 5/2001 | Viron |
| 6,435,201 B2 | 8/2002 | Holzschuh |
| 6,464,488 B2 | 10/2002 | Dray |
| 6,681,837 B1 | 1/2004 | Wu et al. |

FOREIGN PATENT DOCUMENTS

| | | |
|---|---|---|
| DE | 4434326 A1 | 6/1995 |
| DE | 10230041 A1 | 2/2004 |

* cited by examiner

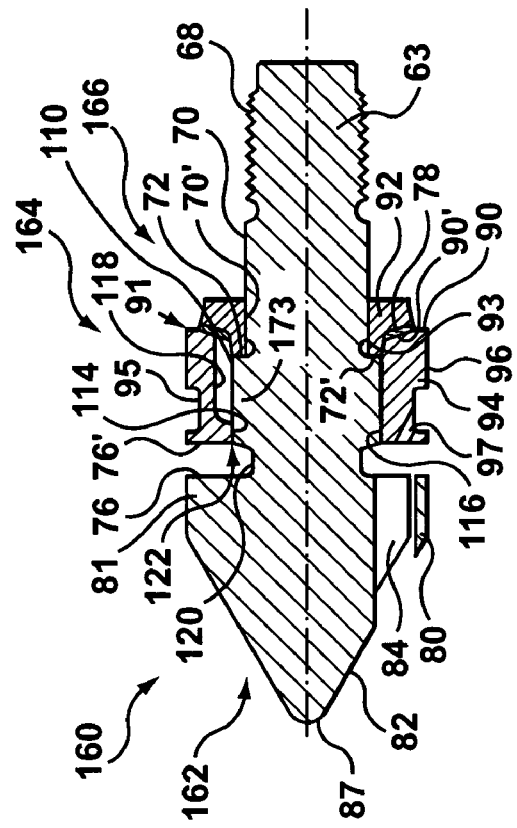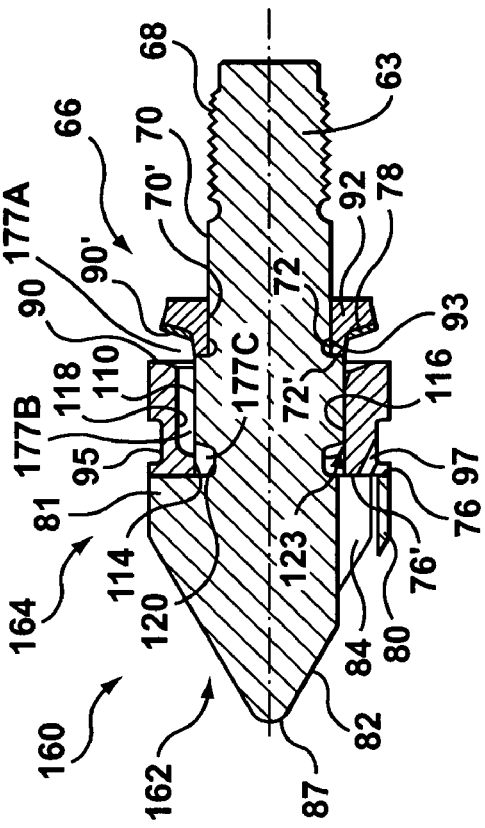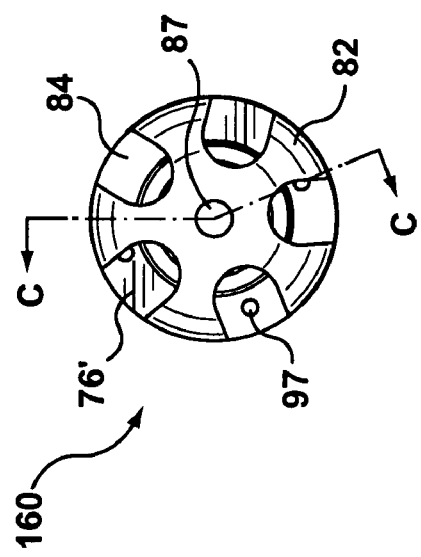

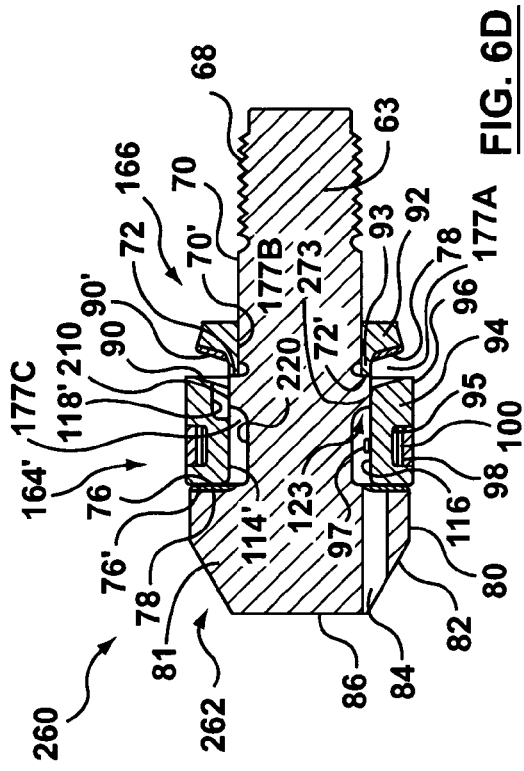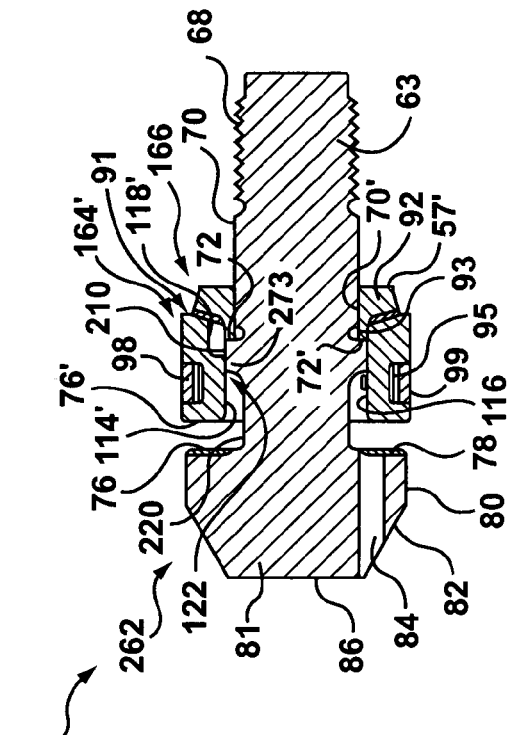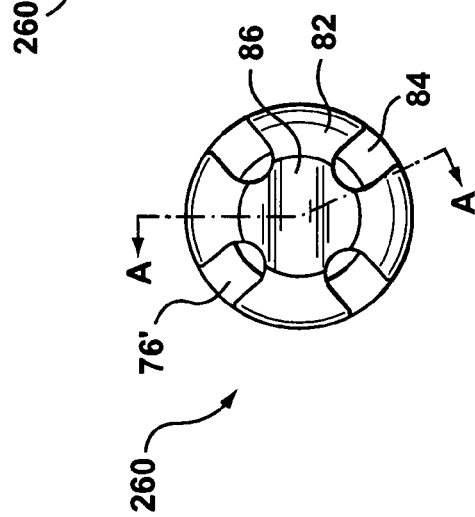

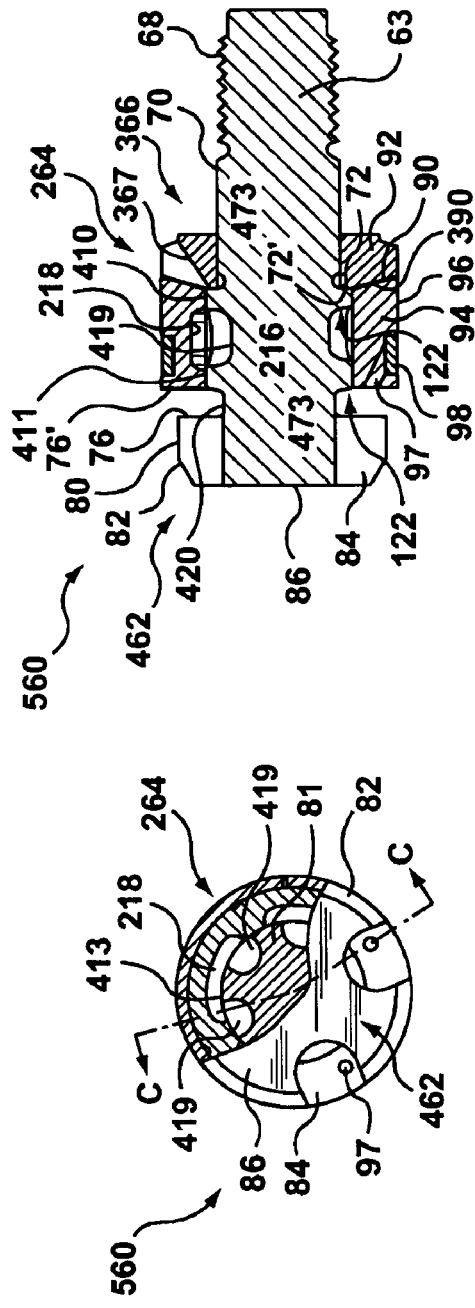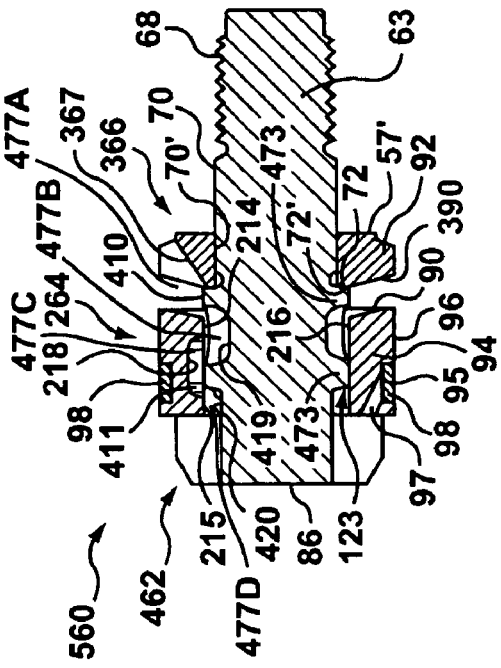

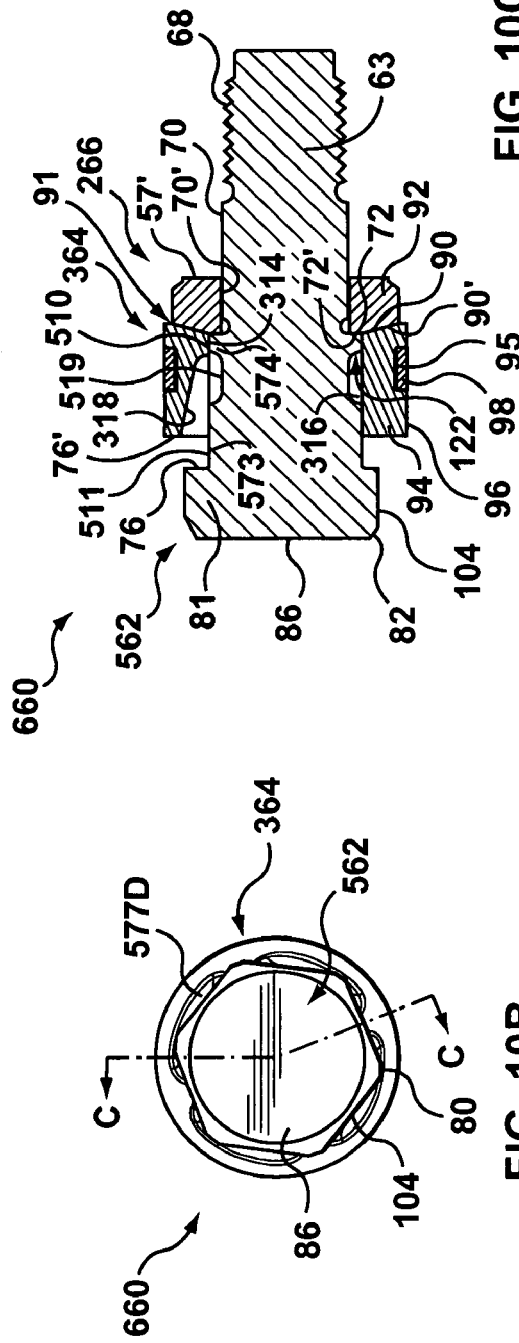
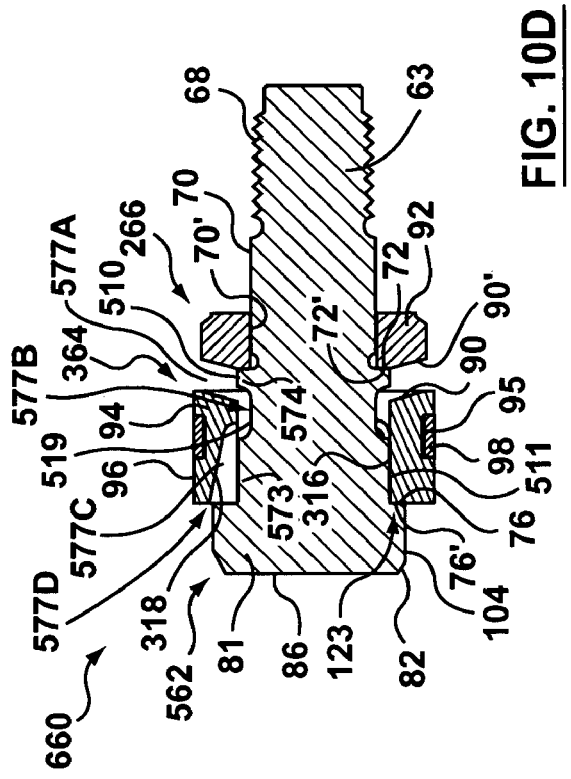
FIG. 10C
FIG. 10D
FIG. 10B

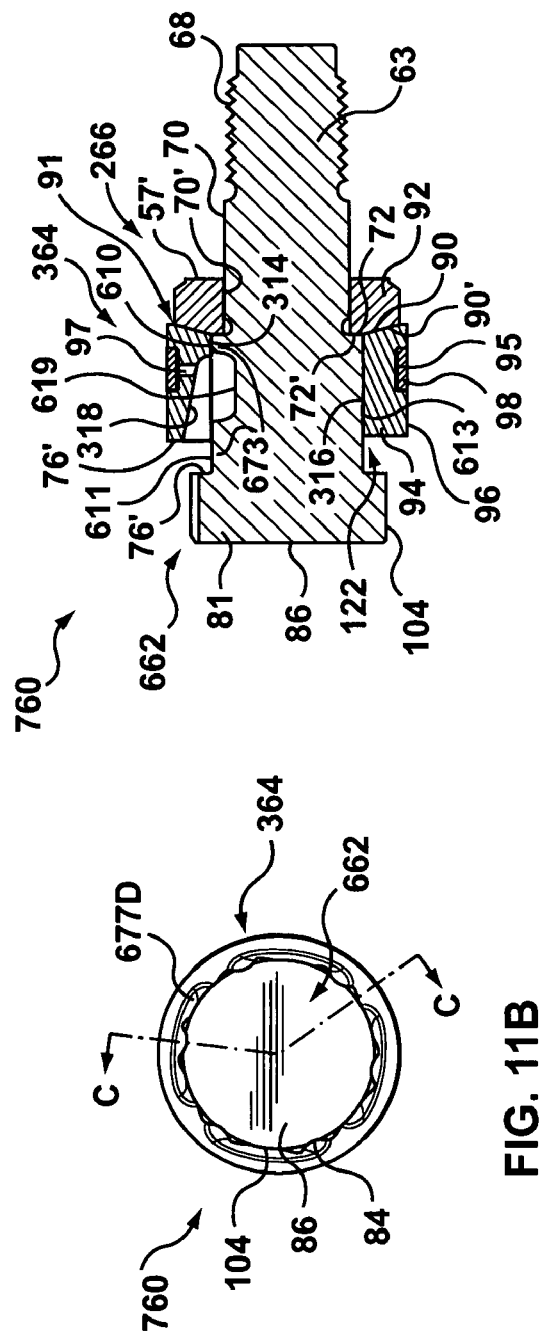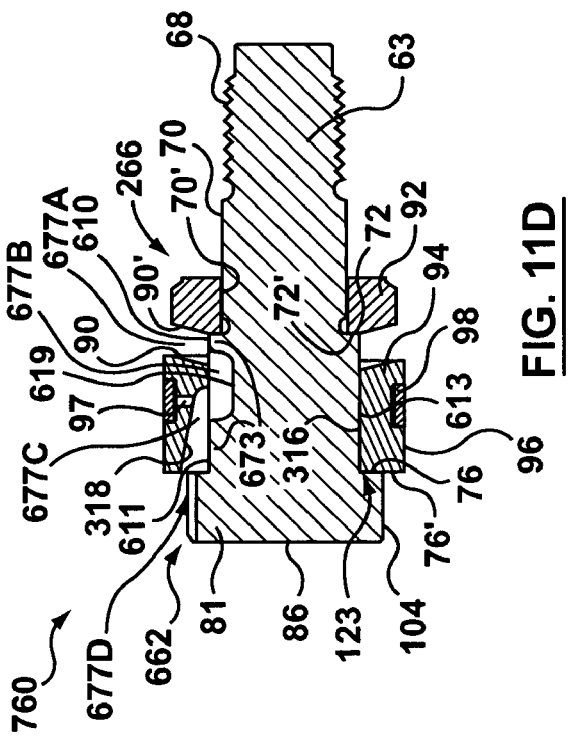

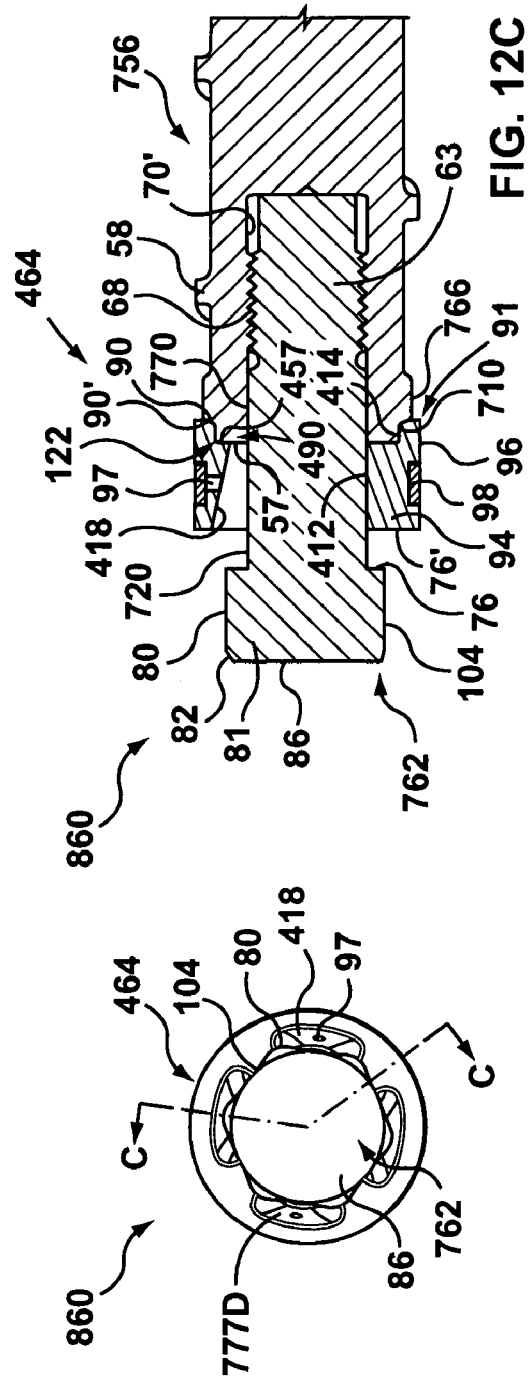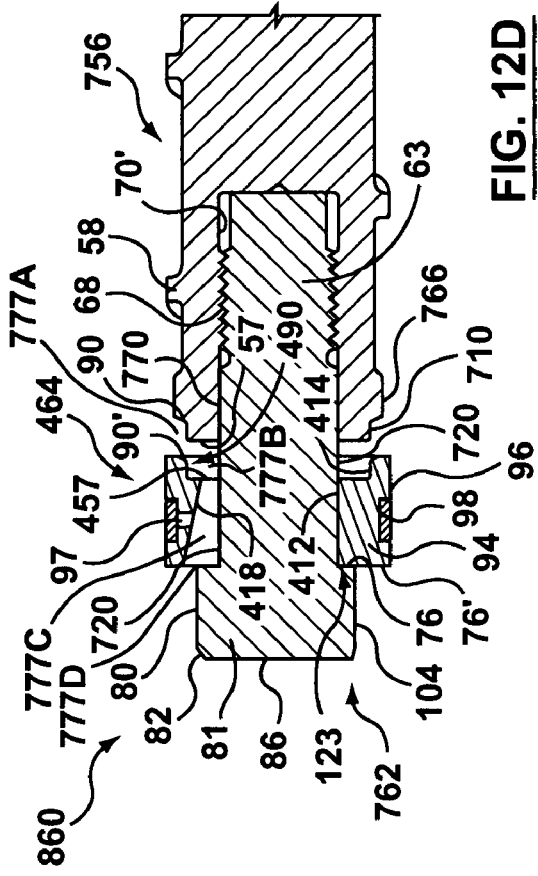

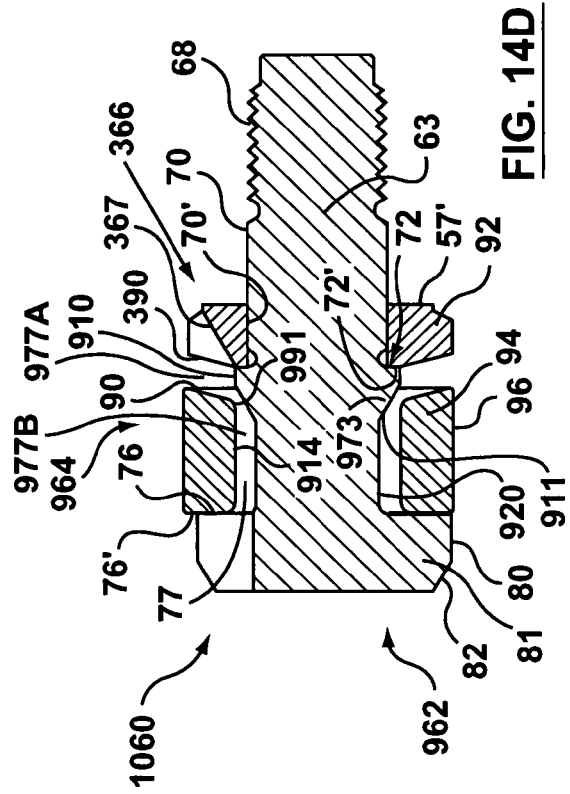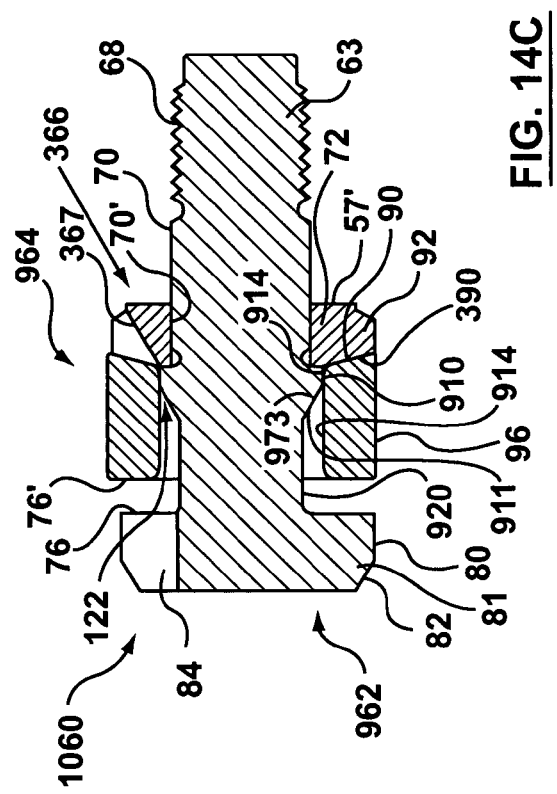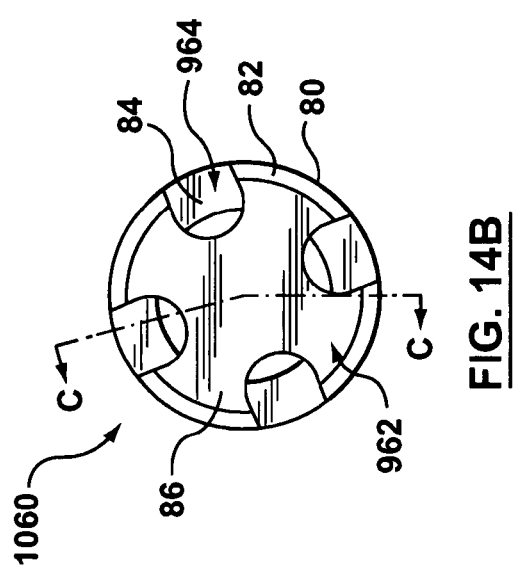

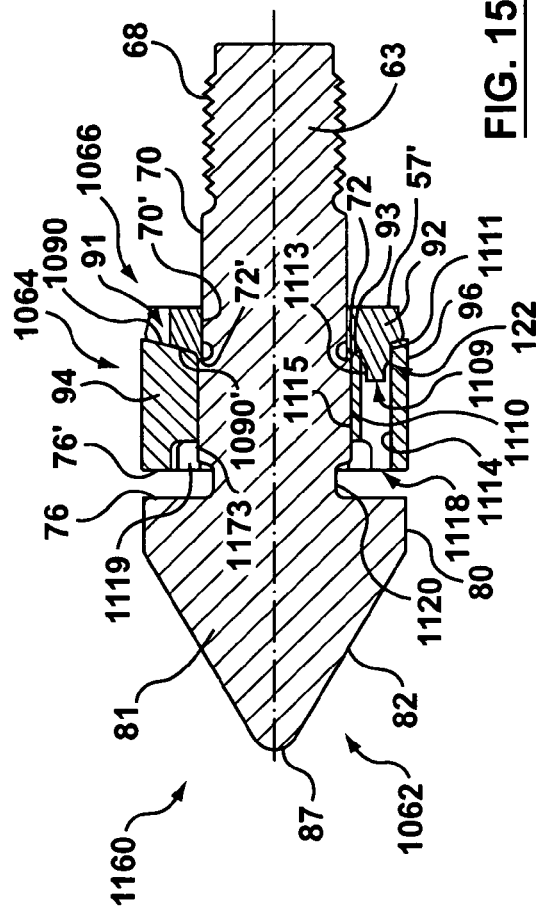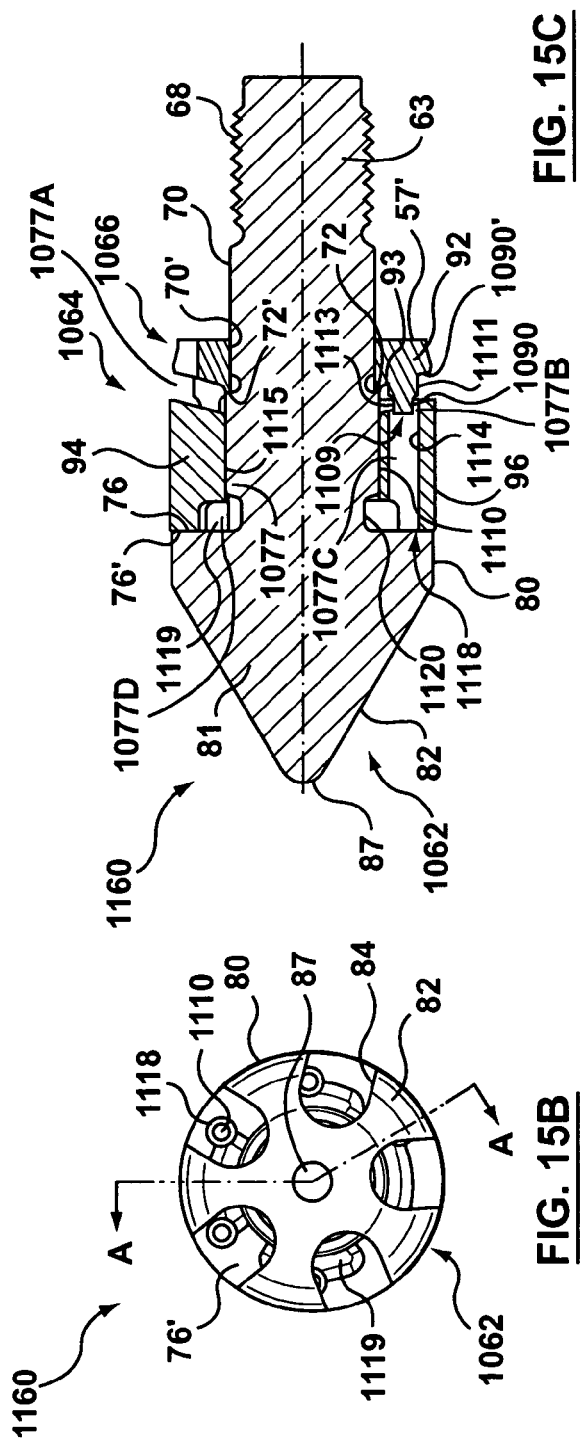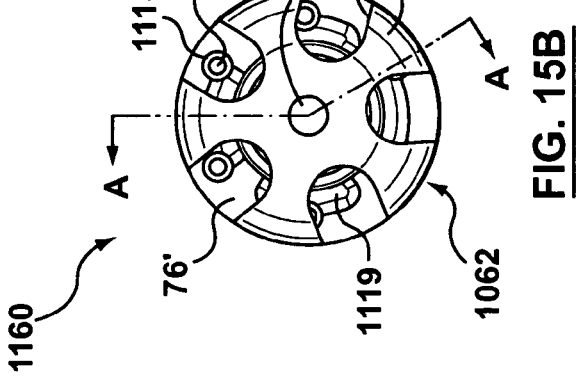

NON-RETURN VALVE FOR USE IN A MOLDING SYSTEM

TECHNICAL FIELD

The present invention relates to a non-return valve that can be configured for use anywhere along a molding material flow path in a molding system. In further detail, the non-return valve of the present invention may be configured for use in a barrel assembly of an injection molding machine. More particularly, the non-return valve of the present invention may be configured for use in an injection molding system for the molding of metal.

BACKGROUND OF THE INVENTION

The structure and operation of the present invention will be explained, hereinafter, within the context of improving the function and durability of a non-return valve that is configured for use in a barrel assembly of an injection molding system for the molding of a metal alloy, such as those of Magnesium, in a semi-solid (i.e. thixotropic) state. A detailed description of the construction and operation of several of such injection molding systems is available with reference to U.S. Pat. Nos. 5,040,589 and 6,494,703. Notwithstanding the foregoing, no such limitation is intended to be imposed on the general utility of the non-return valve of the present invention, or its compatibility with other metal alloys (e.g. Aluminum, Zinc, etc.).

The injection molding system, as described hereinbefore, is shown with reference to FIG. 1 and to FIG. 2.

As is commonly known, the injection molding system 10 includes an injection unit 14 and a clamp unit 12 that are coupled together. The function of the injection unit 14 is to process a solid metal feedstock, not shown, into a melt thereof and for the subsequent injection of the melt into a closed and clamped injection mold arranged in fluid communication therewith. The injection mold is shown in an open configuration as comprising complementary mold hot and cold halves 23 and 25. The injection unit 14 further includes an injection unit base 28 slidably supporting an injection assembly 29 mounted thereon. The injection assembly 29 comprises a barrel assembly 38 arranged within a carriage assembly 34, and a drive assembly 36 mounted to the carriage assembly 34, directly behind the barrel assembly 38, for the operation (i.e. rotation and reciprocation) of a screw 56 arranged within the barrel assembly 38. The barrel assembly 38 is shown to be connected to a stationary platen 16 of the clamp unit 12 through the use of carriage cylinders 30 that function to apply carriage forced along the barrel assembly 38 thereby keeping, in operation, a machine nozzle 44 of the barrel assembly 38 engaged in a sprue bushing 55 of the injection mold whilst the melt is being injected into the mold.

The barrel assembly 38, in further detail, is shown to include an elongate cylindrical barrel 40 with an axial cylindrical bore 48A arranged therethrough, the bore configured to cooperate with the screw 56 arranged therein, for processing and transport of the metal feedstock, and as a means for accumulating and subsequently channeling a melt of molding material during injection thereof. The screw 56 includes a helical flight 58 arranged about an elongate cylindrical body portion 59, a rear portion of the screw, not shown, is configured for coupling with the drive assembly 36, and a forward portion of the screw is configured for receiving a non-return valve 60, in accordance with an embodiment of the present invention, with an operative portion thereof arranged in front of a forward mating face 57 of the screw 56. The barrel assembly 38 also includes a barrel head 42 that is positioned intermediate the machine nozzle 44 and a front end of the barrel 40. The barrel head 42 includes a melt passageway 48B arranged therethrough that connects the barrel bore 48A with a complementary melt passageway 48C arranged through the machine nozzle 44. The melt passageway 48B through the barrel head 42 includes an inwardly tapering portion to transition the diameter of the melt passageway to the much narrower melt passageway 48C of the machine nozzle 44. The central bore 48A of the barrel 40 is also shown as including a liner 46 to protect the barrel substrate material from the corrosive properties of the high temperature metal melt. Other portions of the barrel assembly 38 that come into contact with the melt of molding material may also include similar protective linings or coatings. The barrel 40 is further configured for connection with a source of comminuted metal feedstock through a feed throat, not shown, that is located through a top-rear portion of the barrel, not shown. The feed throat directs the feedstock into the bore 48A of the barrel 40, the feedstock is then subsequently processed into molding material by the mechanical working thereof, by the action of the screw 56 in cooperation with the barrel bore 48A, and by controlled heating thereof. The heat is provided by a series of heaters 50, not all of which are shown, that are arranged along a substantial portion of the length of the barrel assembly 38.

The clamp unit 12 is shown to include a clamp base 18 with a stationary platen 16 securely retained to an end thereof, a clamp block 22 slidably connected at an opposite end of the clamp base 18, and a moving platen 20 arranged to translate therebetween on a set of tie bars 32 that otherwise interconnect the stationary platen 16 and clamp block 22. As is commonly known, the clamp unit 12 further includes a means for stroking, not shown, the moving platen 20 with respect to the stationary platen to open and close the injection mold halves 23, 25 arranged therebetween. A clamping means, not shown, is also provided between the clamp block and the moving platen for the provision of a clamping force between the mold halves 23, 25 during the injection of the melt of molding material. The hot half of the injection mold 25 is shown mounted to a face of a stationary platen 16, whereas the complementary cold half of the mold 23 is mounted to an opposing face of the moving platen 20.

In further detail, the injection mold includes at least one molding cavity, not shown, formed in closed cooperation between complementary molding inserts shared between the mold halves 23, 25. In further detail, the mold cold half 23 includes a core plate assembly 24 with at least one core molding insert, not shown, arranged therein. The mold hot half 25 includes a cavity plate assembly 27, with the at least one complementary cavity molding insert arranged therein, mounted to a face of a runner system 26. The runner system 26 provides a means for connecting the melt passageway 48C of the machine nozzle 44 with the at least one molding cavity for the filling thereof. As is commonly known, the runner system 26 may be an offset or multi-drop hot runner, a cold runner, a cold sprue, or any other commonly known melt distribution means. In operation, the core and cavity molding inserts cooperate, in a mold closed and clamped position, to form at least one mold cavity for receiving and shaping the melt of molding material received from the runner system 26.

The molding process generally includes the steps of:
i) establishing an inflow of metal feedstock into the rear end portion of the barrel 40;

ii) working (i.e. shearing) and heating the metal feedstock into a thixotropic melt of molding material by:
   a. the operation (i.e. rotation and retraction) of the screw 56 that functions to transport the feedstock/melt, through the cooperation of the screw flights 58 with the axial bore 48A, along the length of the barrel 40, past the non-return valve 60, and into an accumulation region defined in front of the non-return valve 60;
   b. heating the feedstock material as it travels along a substantial portion of the barrel assembly 38;
iii) closing and clamping of the injection mold halves 23, 25;
iv) injecting the accumulated melt through the machine nozzle 44 and into the injection mold by a forward translation of the screw 56;
v) optionally filling any remaining voids in the molding cavity by the application of sustained injection pressure (i.e. packing);
vi) opening of the injection mold, once the molded part has solidified through the cooling of the injection mold;
vii) removal of the molded part from the injection mold;
viii) optionally conditioning of the injection mold for a subsequent molding cycle (e.g. application of mold release agent).

The steps of preparing a volume of melt for subsequent injection (i.e. steps i) and ii)) are commonly known as 'recovery', whereas the steps of filling and packing of the at least one mold cavity (i.e. steps iv) and v)) are commonly known as 'injection'.

The non-return valve 60 noted hereinbefore functions to allow the forward transport of melt into the accumulation region at the front of the barrel 40 but otherwise prevents the backflow thereof during the injection of the melt. The proper functioning of the non-return valve 60 relies on a pressure difference between the melt on either side thereof (i.e. higher behind the valve during recovery, and higher in front during injection). The structure and operation of a typical non-return valve, for use in metal injection molding, is described in U.S. Pat. No. 5,680,894.

An example of a typical non-return valve 60 for use in a barrel assembly 38 of an injection molding machine is shown with reference to FIGS. 3A, 3B, & 3C. In further detail, the non-return valve 60 includes: a tip member 62 which is configured to be retained in the forward portion of the screw 56; a ring member 64 which is configured to cooperate with the tip member 62 between a recovery and an injection position defined therealong; and a flange member 66 arranged behind the ring member 64, on tip member 62, to limit the backward travel of the ring member 64 and is further configured to seal with the ring member 64 in the injection position.

The tip member 62 comprises a cylindrical body 63 with a tip flange 81 and a retaining flange 73 arranged on a forward and mid-section, respectively, thereon. Along the length of the tip member 62 are functional portions that include, listed from the rear forward, a screw coupling portion 68, an aligning portion 70, a seat portion 72, an annular flow portion 74, a forward retaining portion 76, a tip circumferential portion 80, a tip tapered portion 82, and a tip planar portion 86.

The screw coupling portion 68 is configured for retaining the tip member 62 in the forward portion of the screw 56, and is provided by forming a helical thread therealong as a part of a threaded coupling.

The aligning portion 70 is configured for axially aligning the tip member 62 with a longitudinal axis of the screw 56, and is provided by a cylindrical mating surface therealong that cooperates with a complementary mating portion 70' formed in the front portion of the screw 56. The aligning portion 70 is also used for similarly aligning the flange member 66 between a forward mating face 57 of the screw 56 and the seat portion 72.

The seat portion 72 includes an undercut formed at the front of the aligning portion 70 and a back face of the seat flange 73.

The annular flow portion 74 includes a rear and a forward cylindrical flow segment that are joined by a forwardly inclined segment, the rear and inclined segments being provided on an outer circumferential and forward surface of the seat flange 73 respectively. The annular flow portion 74 cooperates, in use, with a complementary annular flow portion 74' defined along the inside of the ring member 64 for defining an annular melt passageway 77 therebetween when the ring member is in the recovery position.

The tip flange 81 arranged along the remaining length of the tip member 62 provides the forward retaining portion 76, the tip circumferential portion 80, the tip tapered portion 82, and the tip planar portion 86, on a back face, outer face, forwardly inclined face, and front face, respectively, thereof. Four radially-spaced axial melt discharge grooves 84 are also arranged equiangular-spaced around the tip flange 81 that extend between the back and front faces and through the outer and inclined faces of the tip flange 81, have a longitudinal axis that is parallel to that of the tip member 62, and have about the same depth as the forward segment of the annular flow portion 74. The melt discharge grooves 84 provide passageways for the discharge of the melt from the annular melt passageway 77 into the accumulation region at the front of the barrel bore 48A.

The forward retaining portion 76 cooperates, in use, with a complementary forward retaining portion 76' defined on the ring member 64 for limiting the forward travel of the ring member 64. When the forward retaining portion 76' of the ring member 64 is forced to engage the complementary forward retaining portion 76 of the tip member 62, under the influence of the melt pressure being generated behind the non-return valve 60 by the rotation of the screw 56, the ring member 64 is in its recovery position and the annular melt passageway 77 is open. The surface of the forward retaining portions 76, 76' are shown as being provided by on a resilient hard-facing material 78 in view of avoiding deformation thereof from the cyclic impacts of the forward retaining portions 76, 76'.

The diameter of the tip circumferential portion 80 is configured to cooperate with the barrel bore 48A to assist in the alignment of the tip member 62 with barrel bore 48A, this alignment is otherwise provided by a close fit between the screw flights 58 within the barrel bore 48A which keeps the screw 56 generally aligned therewith (for practical reasons there is typically enough of a gap between the screw flights 58 and the barrel bore 48A such that the screw 56 is never in precise alignment therewith as it sags under its own weight). During injection, the tapered portion 82 and the planar portion 86 both function to pressurize the melt in front thereof as the non-return valve 60 is forced forward along the barrel bore 48A.

The ring member 64 comprises an annular body 94. An outer circumferential surface 96 of the annular body 94 is configured to fit closely within the barrel bore 48A and to cooperate therewith to guide the ring member 64 as it is forced to translate therealong during recovery and injection. The ring member 64 and the tip member 62 remain generally mutually aligned, as characterized hereinbefore, given their centering using the barrel bore 48A, however there is no direct means provided for alignment therebetween.

The ring member 64 also includes a piston ring seat 95 formed as a circumferential groove through the outer circumferential surface 96 between the ends of the ring member 64. The piston ring seat 95 is configured to receive a piston ring 98 and a sub-ring 100 therebeneath, an outer surface 99 of the piston ring 98 provides a seal between the ring member 64 and the barrel bore 48A to prevent the bypass of melt therebetween during injection. A plurality of pressure ports 97 are provided that connect the annular melt passageway 77 with the piston ring seat 95 and which function to pressurize a region behind the sub-ring 100 with melt, during injection. The pressurization of the region behind the sub-ring 100 causes the sub-ring 100 and the piston ring 98 to radially expand which imparts a sealing force between the outer surface 99 of the piston ring 98 and the surface of the barrel bore 48A. The sub-ring 100 operates to seal a split provided in the piston ring and thereby limit the escape of the pressurizing melt. The annular flow portion 74' is configured to follow the profile of the complementary annular flow portion 74 of the tip member 62, in a spaced arrangement therewith, so as to form the annular melt passageway 77 therebetween.

A rear retaining-sealing portion 90' is configured along a rear inwardly tapered face of the annular body 94. The rear retaining-sealing portion 90' functions to cooperate with a complementary rear retaining-sealing portion 90, provided on a front face of the flange member 66, to both limit the backward travel of the ring member 64 and to provide a face-seal 91 therebetween, when the ring member 64 is forced into the injection position, that is intended to prevent the backflow of melt during injection.

Similarly, a forward retaining portion 76', the function of which was described hereinbefore, is provided on a planar front face of the annular body 94. The front retaining portion 76' is shown as being provided on a hard-facing material 78.

The flange member 66 comprises an annular body 92 with a spacing flange portion 93 projecting from the base of a tapered front face thereof. An inner circumferential surface extends across the annular body 92 and provides a complementary aligning portion 70' that is configured to cooperate with the aligning portion 70 of the tip member 62 for aligning, as described hereinbefore, the flange member 66 on the tip member 62. A rear planar face of the annular body 92 provides a complementary mating face 57' that is configured to cooperate with the screw mating face 57 in positioning a complementary seat portion 72', provided on a front face of the spacing flange portion 93, into the seat portion 72, on tip member, thereby securely locating the flange member 66 therebetween. The front face of the annular body 92 provides the retaining-sealing portion 90, described hereinbefore, that is configured to cooperate with the complementary retaining-sealing portion 90' of the ring member 64, in the injection position, to both limit the rearward travel of the ring member 64 and to seal therewith (i.e. close the melt passageway 77). The retaining-sealing portion 90' is shown as being provided on a hard-facing material 78. The diameter of the flange member 66 is appreciably narrower than the barrel bore 48A such that an annular gap formed therebetween provides a melt passageway for the forward passage of the melt during recovery.

Another example of a commonly known non-return valve 60 for use in a barrel assembly 38 of an metal injection molding machine is shown with reference to FIGS. 4A, 4B, 4C & 4D. The structure and operation of this non-return valve 60 is principally the same as that previously described and shown in FIGS. 3A, 3B, & 3C. Accordingly, only the differences in structure and operation between the embodiments will be reviewed and the features that are common to both embodiments have been given similar reference numbers. Of notable difference are the following: the forward retaining portion 76', on the ring member 64, has been sub-divided across a plurality of equiangularly-spaced standoffs 102; the ring member 64 includes two piston ring 98 installations around its outer surface, and that no sub-rings 100 are used therewith; and the general configuration of the tip flange 81. As can be seen with contrast to FIG. 3A, the tip flange 81 lacks the radially-spaced axial melt discharge grooves 84 as the tip circumferential portion 80 is configured to be much narrower than the barrel bore 48A and therefore the gap therebetween provides the discharge passageway. The tip circumferential portion 81 also includes a hexagonal arrangement of tooling flats 104 that assist in the installation and removal of the tip member 62 in the screw 56. Lastly, the tip flange 81 includes a ball-nose portion 87 in place of the planar portion 86, a change that is of no consequence to the pressurizing of the melt.

The proper operation of these types of non-return valve 60, during injection, is contingent on an intimate face-seal 91 provided between the complementary rear retaining-sealing portions 90' and 90 that are arranged on the ring member 64 and the flange member 66 respectively. Without an intimate face-seal 91 significant leakage may occur in association with a sudden loss of the pressure drop across the ring member.

Although it isn't well understood, a failure to achieve and/or sustain an intimate face-seal 91 for the duration of the injection step is thought to be caused by factors including melt non-uniformity and the injection dynamics.

In further detail, the non-uniformity of the melt of molding material (i.e. the inclusions of un-melted and irregularly sized feedstock particles) may allow for solid feedstock to become trapped between the retaining-sealing portions 90, 90'.

In addition, the dynamics within the barrel assembly 38 during injection impart extreme and widely varying forces on the components of the non-return valve 60 to such an extent that it is quite often necessary to make undesirable concessions in an injection profile (i.e. speed and acceleration of the screw 56) to avoid unreliable valve closing (i.e. achieving and maintaining the face-seal 91), particularly during the transition between the steps of injection and packing wherein the non-return valve undergoes a near instantaneous deceleration. The extreme dynamics are the inevitable result of the extremely small amount of injection time available (i.e. the time required to completely fill the at least one molding cavity, that is typically in the range of 30-50 milliseconds) without otherwise encountering filling problems due to melt freezing, and due to the properties of the melt (i.e. low viscosity and compressibility). Consequently, there is an extremely abrupt screw 56 acceleration, high injection speed (typically upwards of 6 meters per second), and after the filling of the at least one molding cavity the lack of melt compressibility effectively stops the screw 56 instantaneously. The loss of intimate contact most often occurs at initial closing impact (i.e. the transition form recovery to injection), and at the end of injection stroke due to sudden deceleration of the screw.

Unfortunately, practical experience has also shown that the integrity of the retaining-sealing portions 90, 90, and hence the ability to achieve an intimate face-seal 91, degrades at an unacceptably fast rate under normal operating conditions. Frequent compensating adjustments to the molding process are therefore required to compensate for the increasing backflow across the non-return valve 60 (e.g.

increasing the volume of melt in the accumulation region, decreasing the injection speed, etc). The rapid degradation of the retaining sealing portion 90, 90' isn't well understood but contributing factors are thought to include: off-center loading thereon caused by poor alignment; high impact forces; and from trapped solids (e.g. un-melted feedstock, hard carbide particles which entered with the feedstock and that are a remnant from feedstock comminution, etc.). Furthermore, it has been noted that the higher the percent solids in the molding material the faster the retaining-sealing portions 90, 90' degrade. To make matters worse still, the high melt temperature (typically upwards of 600° C.) may slowly anneal the substrate material of the valve components and thereby reduce the resiliency of the retaining-sealing surfaces 90, 90'.

The degradation of the retaining-sealing portions 90, 90 typically requires servicing or replacement of the non-return valve 60 in as few as 10-60,000 molding cycles (i.e. weeks of service) which is quite a time consuming and complicated undertaking given the extent to which the injection and barrel assemblies 29, 38 need to be disassembled and all of the routine complications caused by the solidified molding material remaining therein. This servicing requirement incurs large costs in lost productivity (i.e. low system availability) and need for highly skilled technical labor.

Hence, there is a need for an improved non-return valve for use in a molding system that is more durable and that provides reliable valve closing. In further detail, there is a need for a non-return valve for use in an injection molding machine for the molding of a metal alloy with an improved means for sealing against the backflow of molding material during injection.

SUMMARY OF THE INVENTION

The non-return valve of the present invention advantageously includes a 'spigot-seal' for substantially restricting the backflow of melt through the melt passageway of the non-return valve, in the injection position, that maintains its function despite any transient motion between the ring and tip members. The spigot-seal is provided between overlapping, closely-spaced, and mutually parallel complementary male and female spigot portions that are configured between any combination of the ring member, tip member, flange member, or the end of the screw. The spigot portions are also characterized in that their surface normals are substantially perpendicular to the longitudinal axis of the non-return valve. The spigot-seal may be used alone or in combination with the face-seal (e.g. between the ring and flange members). When used in combination with the face-seal the spigot-seal is intended to mitigate any pressure loss that may otherwise result from a momentary loss of an intimate face-seal.

A further advantage that is provided by the spigot-seal is its resiliency. In further detail, the spigot-seal functions by restricting the melt flow between the closely-spaced spigot portions and hence is less susceptible to minor misalignment between the tip and ring members and to the degradation of the surface quality of the spigot portions.

A non-return valve of the present invention may advantageously include a means for mutually aligning the tip and ring members. Preferably, the means for aligning is provided as complementary portions divided between the tip and ring members that cooperate, in use, to axially align the tip and ring members such that the complementary sealing and/or rear retaining portions, provided thereon, are mutually oriented as they engage one another at the time of the closing impact. Accordingly a more consistent and even loading of the complementary sealing and/or rear retaining portions will help to minimize degradation thereof due to the high impact forces (i.e. avoidance of the off-center loading ). Preferably, the means for mutually aligning the tip and ring members is further configured for guiding the ring member in continuous alignment with the tip member between the injection and the recovery positions.

The means for mutually aligning the tip and ring members may also be advantageously used in combination with the spigot-seal. Accordingly, a proper alignment between the closely-spaced spigot portions is ensured. Furthermore, the complementary aligning and spigot portions may also be advantageously configured across common surfaces on the ring and tip members respectively.

The tip member, ring member, and means for mutually aligning the tip and ring members may also be advantageously configured such that a component of the weight of the screw 56 is directed substantially normally across the complementary aligning portions such that a moderate friction force is generated therebetween that assists in maintaining the face-seal 91 by working against the dynamics that tends to momentarily displace the ring member at initial impact and as the screw is suddenly decelerated at the end of injection. The friction may also reduce any transient loss of contact between the face-seal 91 sealing portions at the beginning of injection by preventing an otherwise unconstrained ring member from 'taking-off' due to the initial closing impact.

In accordance with a first aspect of the invention, a non-return valve is provided that is configured for use in a flow channel of a molding system. The non-return valve comprises a tip member, and a ring member arranged, in use, around a medial portion of the tip member. The tip and ring members are mutually configured to support a relative longitudinal reciprocation therebetween, in use, between a open and a closed position relative to one another. The non-return valve further includes a rear retainer comprising complementary retaining portions arranged on the tip and ring members for limiting, in use, a rearward translation between the ring and tip members to the closed position. Similarly, the non-return valve further includes a forward retainer comprising complementary retaining portions arranged on the tip and ring members for limiting, in use, a forward translation between the ring and tip members to the open position. The non-return valve also includes a plurality of melt flow portions configured along at least two of the ring member, tip member, and any of the retaining portions. The melt flow portions being configured to cooperate in providing a melt flow passageway therebetween when the ring and tip members are arranged in the open position. The non-return valve also includes at least a pair of complementary spigot portions configured on the melt flow portions that cooperate in a substantially closely-spaced, overlapping, and parallel arrangement when the ring and tip members are in the closed position. In use, the complementary spigot portions cooperate to provide a spigot-seal, when the ring and tip members are in the closed position, that substantially restricts the backflow of melt therebetween.

BRIEF DESCRIPTION OF THE DRAWINGS

Exemplary embodiments of the present invention will now be described with reference to the accompanying drawings, in which:

FIGS. 5A, 5B, 5C, & 5D are a perspective, front, and section views, respectively, of a non-return valve in accordance with a first embodiment of the present invention, the section views are taken along section line A-A of FIG. 5B with the non-return valve configured for injection and recovery in FIGS. 5C and 5D respectively;

FIGS. 6A, 6B, 6C, & 6D are a perspective, front, and section views, respectively, of a non-return valve in accordance with a presently preferred embodiment of the present invention, the section views are taken along section line A-A of FIG. 6B with the non-return valve configured for injection and recovery in FIGS. 6C and 6D respectively;

FIGS. 9A, 9B, 9C, & 9D are a perspective, front, and section views, respectively, of a non-return valve in accordance with an alternative embodiment of the present invention, the section views are taken along section line A-A of FIG. 9B with the non-return valve configured for injection and recovery in FIGS. 9C and 9D respectively;

FIGS. 10A, 10B, 10C, & 10D are a perspective, front, and section views, respectively, of a non-return valve in accordance with an alternative embodiment of the present invention, the section views are taken along section line A-A of FIG. 10B with the non-return valve configured for injection and recovery in FIGS. 10C and 10D respectively;

FIGS. 11A, 11B, 11C, & 11D are a perspective, front, and section views, respectively, of a non-return valve in accordance with an alternative embodiment of the present invention, the section views are taken along section line A-A of FIG. 11B with the non-return valve configured for injection and recovery in FIGS. 11C and 11D respectively;

FIGS. 12A, 12B, 12C, & 12D are a perspective, front, and section views, respectively, of a non-return valve in accordance with an alternative embodiment of the present invention, the section views are taken along section line A-A of FIG. 12B with the non-return valve configured for injection and recovery in FIGS. 12C and 12D respectively;

FIGS. 14A, 14B, 14C, & 14D are a perspective, front, and section views, respectively, of a non-return valve in accordance with an alternative embodiment of the present invention, the section views are taken along section line A-A of FIG. 14B with the non-return valve configured for injection and recovery in FIGS. 14C and 14D respectively;

FIGS. 15A, 15B, 15C, & 15D are a perspective, front, and section views, respectively, of a non-return valve in accordance with an alternative embodiment of the present invention, the section views are taken along section line A-A of FIG. 15B with the non-return valve configured for injection and recovery in FIGS. 15C and 15D respectively;

DETAILED DESCRIPTION OF THE PREFERRED EMBODIMENT(S)

Figure 1:
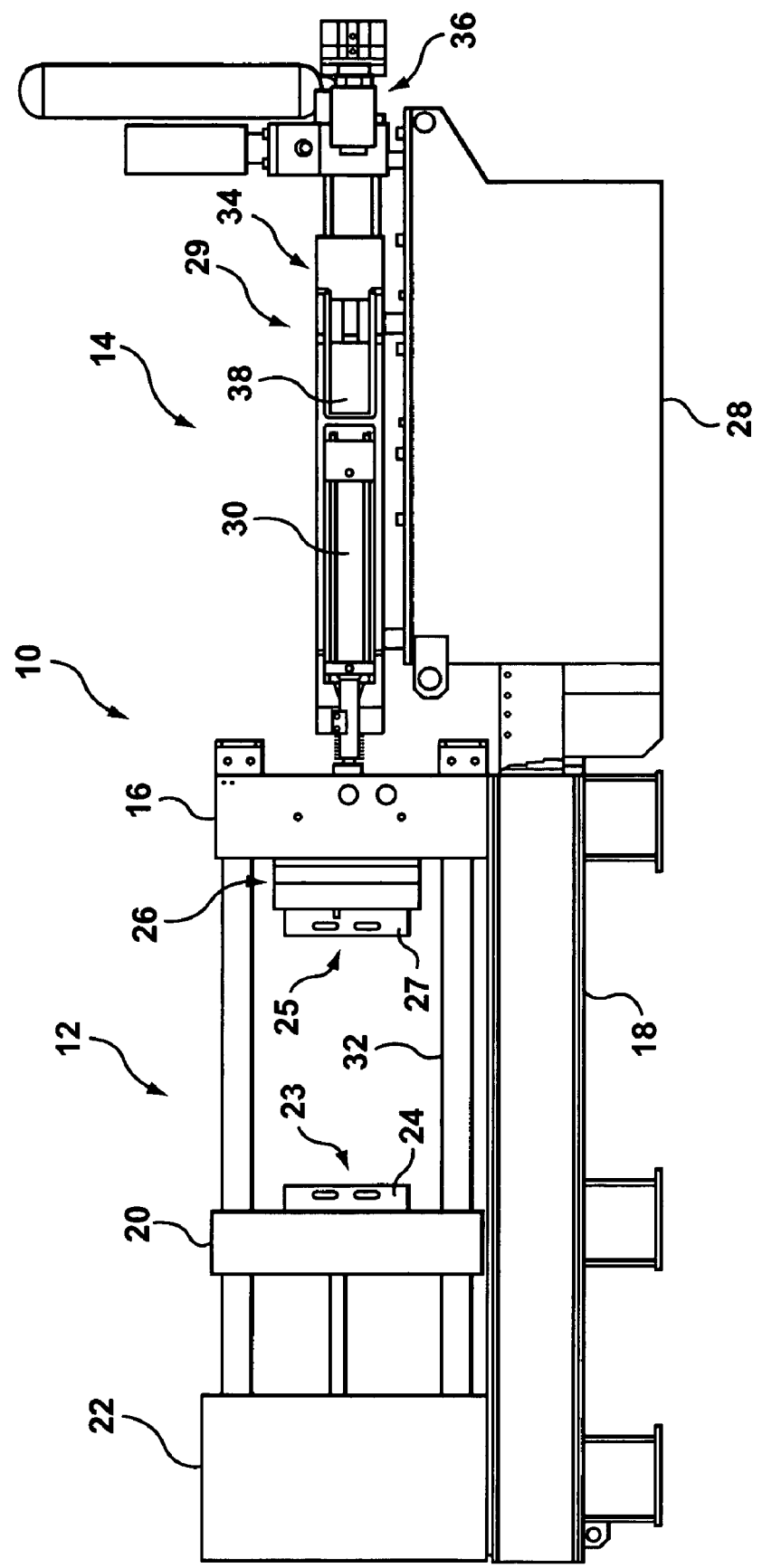
FIG. 1 is a side view of a typical injection molding system.

With reference to FIGS. 1, 5A, 5B, 5C, & 5D, a non-return valve in accordance with a first embodiment of the present invention is shown that is configured for use in a barrel assembly 38 of an injection molding machine 10. The non-return valve 160 includes: a tip member 162 which is configured to be retained in the forward portion of the screw 56; a ring member 164, slidably arranged on the tip member 162, that is configured to cooperate with the tip member 162 between a recovery and an injection position defined therealong; and a flange member 166, arranged on a rear portion of the tip member 162, behind the ring member 164.

The tip member 162 comprises a cylindrical body 63 with a conical tip flange 81 and a cylindrical spigot flange 173 arranged around a forward and mid-section, respectively, thereon. Along the length of the tip member 162 are functional portions that include, listed from the rear forward, a screw coupling portion 68, an aligning portion 70, a seat portion 72, an outer guiding-spigot-flow portion 110, a routing portion 120, a forward retaining portion 76, a tip circumferential portion 80, a tip tapered portion 82, and a ball-nose portion 87.

The screw coupling portion 68 is configured for retaining the tip member 162 in the forward portion of the screw 56, and is provided by forming a helical thread therealong as a part of a threaded coupling.

The aligning portion 70 is configured for axially aligning the tip member 162 with a longitudinal axis of the screw 56, and is provided by a cylindrical mating surface therealong that cooperates with a complementary mating portion 70' formed in the front portion of the screw 56. The aligning portion 70 is also used for similarly aligning the flange member 166 between a forward mating face 57 of the screw 56 and the seat portion 72. The seat portion 72 includes an undercut formed at the front of the aligning portion 70 and a back face of the spigot flange 173.

The outer guiding-spigot-flow portion 110 is configured along an outer circumferential surface of the spigot flange 173. The outer guiding-spigot-flow portion 110 is configured to cooperate with a complementary inner guiding-spigot-flow portion 112 on the ring member 164 to provide the functions of: guiding the ring member 164 in continuous alignment with the tip member 162 between the injection and the recovery positions; and to provide a spigot-seal therebetween, as described hereinbefore, when the ring member 164 is in the injection position. The inner guiding-spigot-flow portion 112, described hereinafter, is configured along an inner circumferential surface of the ring member 164. The outer guiding-spigot-flow portion 110 is also configured to cooperate with a number of transfer portions 118 that are provided around an inside rear portion of the ring member 164, described hereinafter, such that when the ring member 164 is in the recovery position a melt branch passageway 177B is provided between each transfer portion 118 and the guiding-spigot-flow portion 110 of the tip member 162.

The routing portion 120 is provided between a front face of the spigot flange 173 and a rear face of the tip flange 81. The routing portion 120 is configured to cooperate with a spigot-flow sub-portion 114 of the ring member 164, when the ring member 164 is in the recovery position, for providing a routing melt passageway 177C between an overlapping portion of each transfer portion 118 and a number of radially-spaced axial melt discharge grooves 84 that are arranged along the tip flange 81.

The tip flange 81 arranged along the remaining length of the tip member 162 provides the forward retaining portion 76, the tip circumferential portion 80, the tip tapered portion 82, and the tip ball-nose portion 87, on a back face, outer face, forwardly inclined face, and front face, respectively, thereof. The radially-spaced axial melt discharge grooves 84, of which there are five, are arranged equiangular-spaced around the tip flange 81, extend along the tip member 162 between the back and inclined faces of the tip flange 81, generally parallel to the longitudinal axis of the tip member 62, and through the outer and inclined faces of the tip flange 81 to about the depth of the routing portion 120.

The forward retaining portion 76 cooperates, in use, with a complementary forward retaining portion 76' defined on a front face of the ring member 164 for limiting the forward travel of the ring member 164. When the forward retaining portion 76' of the ring member 164 is forced to engage the complementary forward retaining portion 76 of the tip member 162, under the influence of the melt pressure being generated behind the non-return valve 160 by the rotation of the screw 56, the ring member 164 is in its recovery position and the melt passageway 177 (i.e. 177A, 177B, 177C) is open.

The diameter of the tip circumferential portion 80 is configured to cooperate with the barrel bore 48A to assist in the alignment of the tip member 162 with barrel bore 48A. During injection, the tapered portion 82 and the ball-nose portion 87 both function to pressurize the melt in front thereof as the non-return valve 160 is forced forward along the barrel bore 48A.

The ring member 164 comprises an annular body 94. An outer circumferential surface 96 of the annular body 94 is configured to fit closely within the barrel bore 48A and to cooperate therewith to guide the ring member 164 as it is forced to translate therealong during recovery and injection.

The ring member 164 also includes a piston ring seat 95 formed as a circumferential groove through the outer circumferential surface 96 between the ends of the ring member 164. The piston ring seat 95 is configured to receive a piston ring 98 (without a sub-ring 100), an outer surface 99 of the piston ring 98 provides a seal between the ring member 164 and the barrel bore 48A to prevent the bypass of melt therebetween during injection. A plurality of pressure ports 97 are provided that extend between the forward retaining portion 76' and the piston ring seat 95 for the purpose of pressurizing a region behind the piston ring 98 with melt, during injection, as described hereinbefore.

The forward retaining portion 76', introduced hereinbefore, is provided on a planar front face of the annular body 94 and functions to limit the forward travel of the ring member 164, along the tip member 162, into the recovery position.

A rear retaining-sealing portion 90' is configured along a rear inwardly tapered face of the annular body 94. The rear retaining-sealing portion 90' is configured to cooperate with a complementary rear retaining-sealing portion 90, provided on a front face of the flange member 166, for both limiting the backward travel of the ring member 164 along the tip member 162, and thereby arrange the ring member 164 in the injection position, and to provide a face-seal 91 therebetween. The rear retaining-sealing portion 90 is shown as being provided on a hard-facing material 78 to improve the resiliency thereof.

The inner circumferential surface of the annular body 94 provides the guiding-spigot-flow portion 112 introduced hereinbefore. The guiding-spigot-flow portion 112 comprises two functional sub-portions that include the spigot-flow sub-portion 114 and a number of axial guiding sub-portions 116.

The spigot-flow sub-portion 114 is provided as a narrow cylindrical band that extends along a forward portion of the inner circumferential surface of the annular body 94. The spigot-flow sub-portion 114 is configured to cooperate with a complementary forward portion of the outer guiding-spigot-flow portion 110 to establish a spigot-seal 122 in the injection position. As shown in FIG. 5C, when the ring member 164 is forced into the injection position, the spigot-flow sub-portion 114 (female portion) is placed into a closely-spaced, overlapping, and parallel arrangement with the forward portion of the outer guiding-spigot-flow portion 110 (male portion), the tight space (i.e. very small difference in diameter) between these complementary spigot portions 114, 110 functions to effectively restrict the backflow of melt therethrough.

The axial guiding sub-portions 116 are configured along the inner circumferential surface of four narrow, arcuate, and longitudinally extending members. The longitudinally extending members are a residual of the formation of four identical, equiangular-spaced, and arcuate grooves formed through the inner circumferential surface of the annular body 94, extending from a rear edge of the spigot-flow sub-portion 114 and through a rear face of the annular body 94. The grooves provide the transfer portions 118 introduced hereinbefore. The axial guiding sub-portions 116 are configured to cooperate with the complementary outer guiding-spigot-flow portion 110 to maintain the ring and tip members 164 in mutual axial alignment as the ring member 164 translates relative to the tip member 162 between the injection and recovery positions. In further detail, the axial guiding sub-portions 116 are configured to fit around the complementary outer guiding-spigot-flow portion 110 in a closely-spaced (i.e. very small difference in diameter) arrangement. This sliding and aligning fit shall be referred to as a 'running-fit' 123. The provision of the running-fit 123 between the ring and tip members 164, 162 greatly assists in assuring that the spigot-flow sub-portion 114 is able to align and engage with the closely-spaced complementary forward portion of the guiding-spigot-flow portion 110. Preferably, the screw 56 and non-return valve 160 are configured in the barrel bore 48A such that a component of the weight of the screw 56 is directed substantially normally between the outer guiding-spigot-flow portion 110 of the tip member 162 and the axial guiding sub-portions 116 of the ring member 164 such that a moderate friction force is generated therebetween. The friction force between the complementary guiding portions 110, 116, in addition to that provided between the piston ring outer surface 99 and the barrel bore 48A, assists in maintaining the face-seal 91 between the complementary retaining-sealing portions 90, 90' by working against the dynamics that tends to momentarily displace the ring member at initial impact and as the screw is suddenly decelerated at the end of injection.

The flange member 166 comprises an annular body 92 with a spacing flange portion 93 projecting from the base of a tapered front face thereof. An inner circumferential surface extends across the annular body 92 and provides a complementary aligning portion 70' that is configured to cooperate with the aligning portion 70 of the tip member 162 for aligning, as described hereinbefore, the flange member 166 on the tip member 162. A rear planar face of the annular body 92 provides a complementary mating face 57' that is configured to cooperate with the screw mating face 57 in positioning a complementary seat portion 72', provided on a front face of the spacing flange 93, into the seat portion 72, on tip member, thereby securely locating the flange member 166 therebetween. The front face of the annular body 92 provides the retaining-sealing portion 90, described hereinbefore, that is configured to cooperate with the complementary retaining-sealing portion 90' of the ring member 64, in the injection position, to both limit the rearward travel of the ring member 64 and to form a face-seal 91 therewith (i.e. close the melt passageway 177). The complementary retaining-sealing portions 90, 90' also cooperate when the ring member 164 is arranged in the recovery position wherein a large gap therebetween provides an annular inlet passageway 177A that interconnects a portion of the barrel bore 48A behind the non-return valve 160 and the melt branch passageways 177B. Preferably, the retaining-sealing portion 90' is provided on a hard-facing material 78. The diameter of the flange member 166 is appreciably narrower than the barrel bore 48A such that an annular gap formed therebetween provide a melt passageway for the forward passage of the melt during recovery With reference to FIGS. 6A, 6B, 6C, & 6D, a non-return valve 260 in accordance with a presently preferred embodiment of the present invention is shown that is configured for use in a barrel assembly 38 of an injection molding machine 10. The non-return valve 260 is very similar to that previously described and shown with reference to FIGS. 5A, 5B, 5C, & 5D. Accordingly, only the differences in structure and operation between the embodiments will be reviewed and the features that are common to both embodiments have been given similar reference numbers. As before, the non-return valve 260 includes: a tip member 262, a ring member 164', and the flange member 166.

The non-return valve 260 is an example of a reconfiguration of the complementary spigot and guiding portions wherein the location of the spigot-seal 122 is moved closer to the face-seal 91. Accordingly, the ring and tip members 164', 262 include complementary inner and outer guiding-spigot-flow portions 112', 210, respectively.

In further detail, the inner guiding-spigot-flow portion 112' is configured across the inner circumferential surface of the annular body 94, and comprises two functional sub-portions that include a spigot-flow sub-portion 114' and a number of axial guiding sub-portions 116'. To accommodate the rearward shift in the location of the spigot-seal 122, the relative longitudinal extent of the functional sub-portions 114', 116' were changed. In further detail, the longitudinal extent of the guiding-spigot-flow sub-portion 114' is much longer whereas the extent of the axial guiding sub-portions 116' is correspondingly shorter. Accordingly, the spigot portion has been shifted to a rear portion of the spigot-flow sub-portion 114'. As a consequence of the changes in the configuration of the inner guiding-spigot-flow portion 112', the longitudinal extent of the transfer portions 118', defined in the grooves between the axial guiding sub-portions 116', are also correspondingly shortened.

The outer guiding-spigot-flow portion 210 is configured across the outer circumferential surface of a cylindrical spigot flange 273 that is provided around a mid-section of the tip member 262. To the extent that the non-return valve 260 is to operate in the same manner as previously described, without changing the length of the tip member 262 and the stroke length of the ring member 164' (as measured between the injection and recovery positions), it is necessary to change the longitudinal extent of the spigot flange 273, and consequently the extent of the outer guiding-spigot-flow portion 210 and the routing portion 220 in front thereof, in proportion to the change in length of the transfer portions 118'. Accordingly, the spigot flange 273 is narrower in view of the shorter transfer portions 118' described hereinbefore.

It should be noted that because of the increased length of the routing portion 220 it was also possible to move the inlets for the piston ring pressure ports 97 directly beneath the piston ring seat 95 on the spigot-flow sub-portion 114'.

The other differences in the configuration of the tip member 262 are not particularly relevant to the present invention and are merely illustrative of other possible variations. They include: the truncation of the tip portion 81 as to include a tip planar portion 86 in place of the ball-nose 87; the provision of only four melt discharge grooves 84 instead of five; and that the circumferential portion 80 is not configured to cooperate with the barrel bore 48A for providing any additional guidance for the tip member 262 (i.e. not required given the running-fit 123 between the ring and tip members 164', 262).

With reference to FIGS. 7A, 7B, 7C, & 7D, a non-return valve 360 in accordance with an alternative embodiment of the present invention is shown that is configured for use in a barrel assembly 38 of an injection molding machine 10. The non-return valve 360 is very similar to that previously described and shown with reference to FIGS. 5A, 5B, 5C, & 5D. Accordingly, only the differences in structure and operation between the embodiments will be reviewed and the features that are common to both embodiments have been given similar reference numbers. As before, the non-return valve 360 includes: a tip member 362, a ring member 264, and a flange member 266.

The non-return valve 360 is another example of a reconfiguration of the complementary spigot and guiding portions wherein an additional spigot-seal 122 is provided between the ring and tip members 264, 362 immediately adjacent the face-seal 91. Accordingly, the ring member 264 includes an inner guiding-spigot-flow portion 212, and the tip member 362 includes complementary rear-outer spigot-flow portion 310 and a forward-outer guiding-spigot-flow portion 311.

In further detail, the inner guiding-spigot-flow portion 212 is configured across the inner circumferential surface of the annular body 94. The inner guiding-spigot-flow portion 212 comprises three functional sub-portions that include a forward spigot-flow sub-portion 215, a rear spigot-flow sub-portion 214 and four axial guiding sub-portions 216 configured therebetween.

The rear and forward spigot-flow sub-portions 214, 215 are both provided as narrow cylindrical bands that extend along a rear and forward portion, respectively, of the inner circumferential surface of the annular body 94. The rear and forward spigot-flow sub-portions 214, 215 are configured to cooperate with the complementary rear-outer spigot-flow portion 310 and the forward-outer guiding-spigot-flow portion 311 to establish spigot-seals 122 therebetween when the ring member 264 is in the injection position. Similarly, the rear and forward spigot-flow sub-portions 214, 215 are configured to cooperate with a transfer portion 319 and a routing portion 320, respectively, both of which are provided in the tip member 362, for providing a transfer and a routing melt passageway 377B, 377D, respectively, therebetween when the ring member 264 is in the recovery position. The configuration of the transfer portion 319 and routing portion 320 will be described hereinafter.

The axial guiding sub-portions 216 are configured along the inner circumferential surface of four narrow, arcuate, and longitudinally extending members. The longitudinally extending members are a residual of the formation of four identical, equiangular-spaced, and arcuate grooves through the inner circumferential surface of the annular body 94, extending between the rear and forward spigot-flow sub-portions 214, 215. Each of the grooves provides a transfer portion 218 that is configured to cooperate with the forward-outer guiding-spigot-flow portion 311, when the ring member 264 is in the recovery position, defining a melt branch passageway 377C therebetween that connects the melt transfer passageway 377B with the routing melt passageway 377D. The axial guiding sub-portions 116 are configured to cooperate with the complementary forward-outer guiding-spigot-flow portion 311 in a running-fit 123 to maintain the ring and tip members 264, 362 in mutual axial alignment as the ring member 264 translates relative to the tip member 362 between the injection and recovery positions.

The tip member 362 is essentially configured as tip member 262 except that the functional portions between the seat portion 72 and the routing portion 120 comprise, listed from the rear forward, the rear-outer spigot-flow portion 310, the transfer portion 319, and the forward-outer guiding-spigot-flow portion 311. The rear-outer spigot-flow portion 310 is provided on an outer surface of a cylindrical second spigot flange 374. The second spigot flange 374 is about the same width as the rear spigot-flow sub-portion 214. Furthermore, the second spigot flange 374 is located along the tip member 362 such that its back face provides a portion of the seat portion 72 for retaining of the flange member 266, and whereby the rear-outer spigot-flow portion 310 is located immediately adjacent a rear retaining-sealing portion 90' of the flange member 266. The forward-outer guiding-spigot-flow portion 311 is provided on an outer surface of a cylindrical first spigot flange 373. The first spigot flange 373 is located along the tip member 362 such that the forward-outer guiding-spigot-flow portion 311 is located directly beneath the complementary forward spigot-flow sub-portion 215, and a front face of the first spigot flange 373 is located adjacent a forward retaining portion 76' of the ring member 264, when the ring member is in the injection position. The transfer portion 319 is located between a front face of the second spigot flange 374 and a back face of the first spigot flange 373. The width of the first spigot flange 373 is shown to be about twice the width of the forward spigot-flow sub-portion 215. As such, the first spigot flange 373 is wide enough to cooperate with the forward spigot-flow sub-portion 215 to provide a spigot-seal 122 when the ring member 264 is in the injection position. In addition, the first spigot flange 373 is narrow enough that the transfer portions 214 in the ring member 264 may straddle the forward-outer guiding-spigot-flow portion 311, when the ring member 264 is in the recovery position, whereby the ends of the transfer portion 218 overlap both the transfer portion 319 and the routing portion 120, in the tip member 362, for connecting the melt passageways 377B, 377C, and 377D.

The other differences in the configuration of the tip member 362 are not particularly relevant to the present invention and are merely illustrative of other possible variations. They include: the truncation of the tip portion 81 as to include a tip planar portion 86 in place of the ball-nose 87; the provision of only four melt discharge grooves 84 instead of five; and that the circumferential portion 80 is not configured to cooperate with the barrel bore 48A for providing any additional guidance for the tip member 362. Similarly, the flange member 266 is different only in that the spacing flange portion 93 has been omitted.

With reference to FIGS. 8A, 8B, 8C, & 8D, a non-return valve 460 in accordance with an alternative embodiment of the present invention is shown that is configured for use in a barrel assembly 38 of an injection molding machine 10. The non-return valve 460 is very similar to that previously described and shown with reference to FIGS. 7A, 7B, 7C, & 7D. Accordingly, only the differences in structure and operation between the embodiments will be reviewed and the features that are common to both embodiments have been given similar reference numbers. As before, the non-return valve 460 includes: a tip member 462, the ring member 264, and the flange member 266.

The non-return valve 460 is another example of a reconfiguration wherein the rear and forward spigot and guiding portions on the tip member 462 are configured along a common spigot flange and wherein additional guiding portions are provided therebetween. Accordingly, the tip member 462 includes an outer guiding-spigot-flow portion 409 defined along the outer circumferential surface of a spigot flange 473. The outer guiding-spigot-flow portion 409 includes three functional sub-portions comprising a rear-outer spigot-flow sub-portion 410, a forward-outer guiding-spigot-flow sub-portion 411, and a number of axial guiding sub-portions 413 configured therebetween. The addition of the axial guiding sub-portions 413 increases amount of contact area between the complementary inner and outer guiding-spigot-flow portions 212, 409 which will further assist in aligning the tip and ring members 462, 264, and for providing additional friction therebetween.

In further detail, the spigot flange 473 extends along a mid-section of the tip member 462 in the same location and between the same outer limits of the former rear and forward spigot flanges 374, 373. The rear-outer spigot-flow sub-portion 410 and the forward-outer guiding-spigot-flow sub-portion 411 are configured along a rear and a forward portion of the outer circumferential surface of the spigot flange 473. The axial guiding sub-portions 413 are defined along the outer surface of six narrow, arcuate, and longitudinally extending members. The longitudinally extending members are a residual of the formation of six identical, equiangular-spaced, and arcuate grooves formed through the outer circumferential surface of the spigot flange 473, and that extend between the rear-outer spigot-flow sub-portion 410 and the forward-outer guiding-spigot-flow sub-portion 411. The grooves provide transfer portions 419 that are configured to cooperate with the complementary transfer portions 218 in the tip member 264 in the same manner as in the prior embodiment. The width of the rear-outer spigot-flow sub-portion 410 and the forward-outer guiding-spigot-flow sub-portion 411 are about the same as the complementary rear and forward spigot-flow sub-portions 214, 215, respectively.

With reference to FIGS. 9A, 9B, 9C, & 9D, a non-return valve 560 in accordance with an alternative embodiment of the present invention is shown that is configured for use in a barrel assembly 38 of an injection molding machine 10. The non-return valve 560 is very similar to that previously described and shown with reference to FIGS. 8A, 8B, 8C, & 8D. Accordingly, only the differences in structure and operation between the embodiments will be reviewed and the features that are common to both embodiments have been given similar reference numbers. As before, the non-return valve 460 includes: the tip member 462, the ring member 264, and a flange member 366.

The non-return valve 560 is an example wherein the spigot-seals 122 provide the entirety of the required melt backflow restriction during injection without a face-seal 91 being provided between the complementary rear retaining-sealing portion 90 and retaining portion 390, of the ring member 264 and the flange member 366, respectively. Accordingly, around a periphery of the flange member 366 are configured four equiangular-spaced melt inlet grooves 367 that extend through the outer circumferential thereof and between the rear and front faces thereof. The inlet grooves 367 extending through the retaining face 390 preclude a face-seal from being achieved with the complementary rear retaining-sealing face 90 on the ring member 264. The inlet grooves 367 are also characterized in that they have a downward inclination between the rear and front faces of the flange member 366 wherein the root of the inlet grooves 367 intersects with the front face of the flange member 366 directly adjacent the outer guiding-spigot-flow portion 409, on the tip member 462, whereby melt is directed into the melt inlet passageway 477A when the ring member 264 is in the recovery position. In addition, the diameter of the flange member 366 is substantially the same as that of the outer surface 96 of the ring member 264, and hence the outer surface of the flange member 366 is configured to cooperate with the barrel bore 48A to further assist in the centering of the tip member 462.

With reference to FIGS. 10A, 10B, 10C, & 10D, a non-return valve 660 in accordance with a further alternative embodiment of the present invention is shown that is configured for use in a barrel assembly 38 of an injection molding machine 10. The non-return valve 660 is very similar to that previously described and shown with reference to FIGS. 6A, 6B, 6C, & 6D. Accordingly, only the differences in structure and operation between the embodiments will be reviewed and the features that are common to both embodiments have been given similar reference numbers. As before, the non-return valve 660 includes: a tip member 562, a ring member 364, and the flange member 266.

The non-return valve 660 is another example of a reconfiguration of the complementary spigot and guiding portions wherein the routing portion 220 is obviated. Accordingly, the ring member 364 includes an inner guiding-spigot-flow portion 312, and the tip member 562 includes a complementary rear-outer spigot-flow portion 510 and a forward-outer guiding-flow portion 511.

In further detail, the inner guiding-spigot-flow portion 312 is configured across the inner circumferential surface of the annular body 94. The inner guiding-spigot-flow portion 312 comprises two functional sub-portions that include a spigot-flow sub-portion 314, and four axial guiding sub-portions 316.

The spigot-flow sub-portion 314 is provided as a narrow cylindrical band that extends along a rear portion of the inner circumferential surface of the annular body 94. The spigot-flow sub-portion 314 is configured to cooperate with the complementary rear-outer spigot-flow portion 510 to establish a spigot-seal 122 therebetween when the ring member 364 is in the injection position. Similarly, the spigot-flow sub-portion 314 is configured to cooperate with a transfer portion 519, in tip member 562, for providing a melt transfer passageway 577B therebetween when the ring member 364 is in the recovery position. The configuration of the transfer portion 519 will be described hereinafter.

The axial guiding sub-portions 316 are configured along the inner circumferential surface of four narrow, arcuate, and longitudinally extending members. The longitudinally extending members are a residual from the formation of four identical, equiangular-spaced, outwardly diverging (i.e. towards the front of the ring member 364), arcuate grooves through the inner circumferential surface of the annular body 94, extending from a forward edge of the spigot-flow sub-portion 314 and through a front face of the annular body 94. Each of the grooves provides a transfer portion 318 that is configured to cooperate with the forward-outer guiding-flow portion 511, when the ring member 364 is in the recovery position, defining a melt branch passageway 577C therebetween. Each melt branch passageway 577C connects the melt transfer passageway 577B with a melt discharge portal 577D. The melt discharge portals 577D are formed between a portion of each of the transfer portions 318, along the front face of the ring member 364, that are outside the outer surface of the tip flange 81 (i.e. across the tooling flats 104 and the circumferential potion 80). The axial guiding sub-portions 316 are configured to cooperate with the complementary forward-outer guiding-flow portion 511 in a running-fit 123 to maintain the ring and tip members 364, 562 in mutual axial alignment as the ring member 364 translates relative to the tip member 562 between the injection and recovery positions.

The tip member 562 is essentially configured as before except that the functional portions between the seat portion 72 and the forward retaining portion 76 comprise, listed from the rear forward, the rear-outer spigot-flow portion 510, the transfer portion 519, and the forward-outer guiding-flow portion 511. The rear-outer spigot-flow portion 510 is provided on an outer surface of a cylindrical spigot flange 574. The spigot flange 574 is about the same width as the spigot-flow sub-portion 314. Furthermore, the spigot flange 574 is located along the tip member 562 such that its back face provides a portion of the seat portion 72 for retaining of the flange member 266, and whereby the rear-outer spigot-flow portion 510 is located immediately adjacent a rear retaining-sealing portion 90' of the flange member 266. The forward-outer guiding-flow portion 511 is provided on an outer surface of a cylindrical guiding flange 573. The guiding flange 573 extends along the tip between the transfer portion 519 and a rear face of the tip flange 81. The transfer portion 519 is provided between a front face of the spigot flange 574 and a back face of the guiding flange 573. The width of the guiding flange 573 is configured to maintain the running-fit 123 between the complementary guiding portions on ring and tip members 364, 562, between the injection and recovery positions, and that the transfer portion 519 has a sufficient width such that its ends overlap the spigot-flow sub-portion 314, on ring member 364, when the ring member is in the recovery position and thereby interconnect the melt passageways 577A, 577B, and 577C.

The other differences in the configuration of the tip member 562 are not particularly relevant to the present invention and are merely illustrative of other possible variations. They include the obviation of the melt discharge grooves 84 by virtue of a narrower tip flange 81, wherein the outer surface of the tip flange 81 is configured to cooperate with the transfer portions 318, along the front face of the ring member 364, for providing melt discharge portals 577D, as described hereinbefore.

With reference to FIGS. 11A, 11B, 11C, & 11D, a non-return valve 760 in accordance with an alternative embodiment of the present invention is shown that is configured for use in a barrel assembly 38 of an injection molding machine 10. The non-return valve 760 is very similar to that previously described and shown with reference to FIGS. 10A, 10B, 10C, & 10D. Accordingly, only the differences in structure and operation between the embodiments will be reviewed and the features that are common to both embodiments have been given similar reference numbers. As before, the non-return valve 760 includes: a tip member 662, the ring member 364, and the flange member 266.

The non-return valve 760 is another example of a reconfiguration wherein the rear and forward spigot and guiding portions, respectively, on the tip member 662, are configured along a common flange and wherein additional guiding portions are provided therebetween. Accordingly, the tip member 662 includes an outer guiding-spigot-flow portion 609 defined along the outer circumferential surface of a spigot flange 673. The outer guiding-spigot-flow portion 609 includes three functional sub-portions comprising a rear-outer spigot-flow sub-portion 610, a forward-outer guiding-flow sub-portion 611, and a number of axial guiding sub-portions 613 configured therebetween. The addition of the axial guiding sub-portions 613 increases the amount of contact area between the complementary inner and outer guiding-spigot-flow portions 312, 609 which will further assist in aligning the tip and ring members 662, 364, and for providing additional friction therebetween.

In further detail, the spigot flange 673 extends along a mid-section of the tip member 662 in the same location and between the same outer limits of the former rear and forward flanges 574, 573. The rear-outer spigot-flow sub-portion 610 and the forward-outer guiding-flow sub-portion 611 are configured along a rear and a forward portion of the outer circumferential surface of the spigot flange 673. The axial guiding sub-portions 613 are defined along the outer surface of six narrow, arcuate, and longitudinally extending members. The longitudinally extending members are a residual of the formation of six identical, equiangular-spaced, and arcuate grooves formed through the outer circumferential surface of the spigot flange 673, and that extend between the rear-outer spigot-flow sub-portion 610 and the forward-outer guiding-flow sub-portion 611. The grooves provide transfer portions 619 that are configured to cooperate with the complementary transfer portions 318 in the tip member 264 in the same manner as in the prior embodiment. The provision of the axial guiding sub-portions 613 also allows for a wider transfer portions 619, and as consequence, the forward-outer guiding-flow sub-portion 611 is correspondingly narrower than in the prior embodiment.

The other differences in the configuration of the tip member 662 are not particularly relevant to the present invention and are merely illustrative of other possible variations. They include the provision of melt discharge grooves 84, as described hereinbefore, that are configured to cooperate with the melt discharge portals 677D.

With reference to FIGS. 12A, 12B, 12C, & 12D, a non-return valve 860 in accordance with a further alternative embodiment of the present invention is shown that is configured for use in a barrel assembly 38 of an injection molding machine 10. The non-return valve 860 is very similar to that previously described and shown with reference to FIGS. 6A, 6B, 6C, & 6D. Accordingly, only the differences in structure and operation between the embodiments will be reviewed and the features that are common to both embodiments have been given similar reference numbers. Similar to before, the non-return valve 860 includes: a tip member 762, a ring member 464, and a flange portion 766.

The non-return valve 860 is another example of a reconfiguration of the complementary spigot and guiding portions and wherein the flange portion 766, configured near the end of a reconfigured screw 756, replaces the flange member 166. Accordingly, the ring member 464 includes four inner axial guiding-flow portions 412, and a separate inner spigot-flow portion 414. The tip member 762 includes a complementary outer guiding-flow portion 720, whereas the complementary outer spigot-flow portion 710 is provided at the end of a reconfigured screw 756.

In further detail, a unique feature of the ring member 464 of the present embodiment is the provision of a spigot seat 490 that is configured along a rear portion of the annular body 94 as a shallow cylindrical bore formed through a rear face thereof. An inner circumferential surface of the spigot seat 490 provides the inner spigot-flow portion 414. The spigot-flow portion 414 is configured to cooperate with the complementary outer spigot-flow portion 710, configured along an end portion of the screw 756, to establish a spigot-seal 122 therebetween when the ring member 364 is in the injection position. Similarly, the spigot-flow portion 414 is configured to cooperate with the guiding-flow portion 720, configured along the tip member 762, for providing a melt transfer passageway 777B therebetween when the ring member 464 is in the recovery position. A planar front face of the spigot seat 490 provides a retaining face 457 that cooperates with the front face 57 of the screw 756 to limit the backward travel of the ring member 464; this function is otherwise provided, in the present embodiment, through the cooperation of the complementary retaining-sealing portions 90, 90', as described hereinbefore.

The inner guiding-flow portions 412 are configured along the inner circumferential surface of four narrow, arcuate, and longitudinally extending members. The longitudinally extending members are a residual from the formation of four identical, equiangular-spaced, outwardly and laterally diverging (i.e. towards the front of the ring member 364), arcuate grooves through the inner circumferential surface of the annular body 94, extending from the spigot seat 490 and through a front face of the annular body 94. Each of the grooves provides a transfer portion 418 that is configured to cooperate with the outer guiding-flow portion 720, when the ring member 464 is in the recovery position, defining a melt branch passageway 777C therebetween. Each melt branch passageway 777C connects the melt transfer passageway 777B with a melt discharge portal 777D. The melt discharge portals 777D are formed between a portion of each of the transfer portions 418, along the front face of the ring member 464, that are outside the outer surface of the tip flange 81 (i.e. across the tooling flats 104 and the circumferential potion 80). The axial guiding portions 412 are configured to cooperate with the complementary outer guiding-flow portion 720 in a running-fit 123 to maintain the ring and tip members 464, 762 in mutual axial alignment as the ring member 464 translates relative to the tip member 762 between the injection and recovery positions.

The tip member 762 is essentially configured as before except that the functional portions between the aligning portion 70 and the forward retaining portion 76 comprise only the guiding-flow portion 720. The other differences in the configuration of the tip member 562 are not particularly relevant to the present invention and are merely illustrative of other possible variations. They include the obviation of the melt discharge grooves 84 by virtue of a narrower tip flange 81, wherein the outer surface of the tip flange 81 is configured to cooperate with the transfer portions 418, along the front face of the ring member 464, for providing melt discharge portals 777D, as described hereinbefore.

Figure 2:
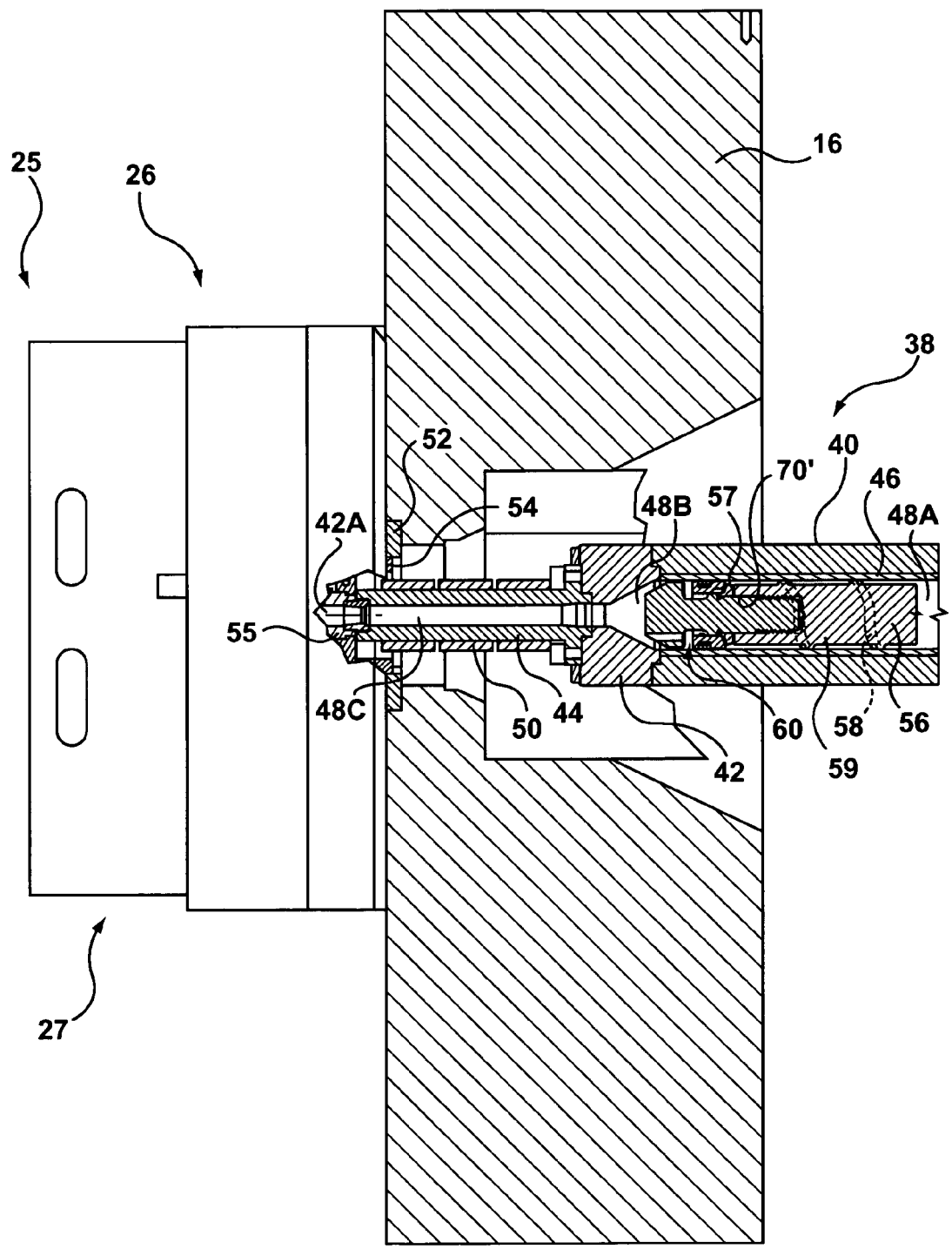
FIG. 2 is a partial section view through a portion of the injection molding machine, the portion including the barrel assembly 38 engaged in the hot half 25 of an injection mold that is mounted on the stationary platen 16.

As introduced hereinbefore, the front end of the screw 756 has been configured to include a flange portion 766, which performs the functions previously ascribed to the flange member 166, and an outer spigot-flow portion 710 that functions as described hereinbefore. In further detail, an outer circumferential surface of the flange member 766 is configured to cooperate with the barrel bore 48A, as shown with reference to FIG. 2, to provide an annular melt passageway therebetween that allows for the forward passage of melt during recovery. The front face of the flange portion 766 provides the retaining-sealing portion 90, described hereinbefore, that is configured to cooperate with the complementary retaining-sealing portion 90' of the ring member 64, in the injection position, to both limit the rearward travel of the ring member 64 and to seal therewith (i.e. close the melt passageway 777A). Around the end of the screw 756, immediately adjacent the flange member 766, is a narrow cylindrical band that is configured to provide the outer spigot-flow portion 710.

With reference to FIGS. 13A, 13B, 13C, & 13D, a non-return valve 960 in accordance with a further alternative embodiment of the present invention is shown that is configured for use in a barrel assembly 38 of an injection molding machine 10. The non-return valve 860 is very similar to that previously described and shown with reference to FIGS. 12A, 12B, 12C, & 12D. Accordingly, only the differences in structure and operation between the embodiments will be reviewed and the features that are common to both embodiments have been given similar reference numbers. As before, the non-return valve 960 includes: a tip member 862, the ring member 464, and a flange member 866.

The non-return valve 960 is a reconfiguration of the prior embodiment of the non-return valve 860 that does not make use of a face-seal 91 and wherein the spigot-seal 122 is provided between complementary portions on the ring and flange members 434, 866. Accordingly, the flange member 866 has been configured to include an outer spigot-flow portion 810 and a complementary retaining portion 490'.

In further detail, the flange member 866 comprises a simple annular body 92 with planar front and back faces (i.e. like a washer). As before, an inner circumferential surface of the annular body 92 is configured to provide a complementary aligning portion 70' that cooperates, in use, with the aligning portion 70 of the tip member 862. The rear planar face of the annular body 92 provides a complementary mating face 57' that is configured to cooperate with the screw mating face 57 in positioning a complementary seat portion 72', provided on a lower portion of the front face of the annular body 92, into a seat portion 72, on tip member 864, thereby securely locating the flange member 866 therebetween. The remaining portion of the front face of the annular body 92 provides a complementary retaining portion 490' that is configured to cooperate with the complementary retaining portion 490, defined in the spigot seat 490 on the ring member 464, to limit the rearward travel of the ring member 64. An outer circumferential surface of the flange member 866 provides the outer spigot-flow portion 810 that is configured to cooperate with the complementary inner spigot-flow portion 414, defined in the spigot seat 490 in the ring member 464, and the outer guiding-flow portion 820, in the injection and recovery positions, respectively, as described with reference to the description of the prior embodiment.

The tip member 862 is essentially configured as in the prior embodiment except that the guiding-flow portion 720 is provided along a shallow flange, the back face of which provides the seat 72 described hereinbefore.

With reference to FIGS. 14A, 14B, 14C, & 14D, a non-return valve 1060 in accordance with an alternative embodiment of the present invention is shown that is configured for use in a barrel assembly 38 of an injection molding machine 10. The non-return valve 1060 is very similar to those previously described and shown with reference to FIGS. 3A-3C and 9A-9D. Accordingly, only the differences in structure and operation between the embodiments will be reviewed and the features that are common to both embodiments have been given similar reference numbers. As before, the non-return valve 1060 includes: a tip member 962, a ring member 964, and the flange member 366.

The non-return valve 1060 is another example of a reconfiguration of the complementary spigot and guiding portions, on the ring and tip members 964, 962, and of the complementary rear retaining portion 390, on the flange member 366, wherein a spigot-seal 122 provides the entirety of the required melt backflow restriction during injection without the provision of a face-seal 91 between the complementary rear retaining-sealing portion 90 and retaining portion 390, of the ring member 264 and the flange member 366, respectively. Accordingly, complementary inner and outer aligning-spigot-flow portions 909, 914 are configured along respective portions of the tip and ring members 962, 964. The complementary inner and outer aligning-spigot-flow portions 909, 914 are further characterized in that there is no provision of a running-fit 123 therebetween, instead, the complementary aligning-spigot-flow portions 909, 914 are configured to mutually align as the ring member 964 slides into the injection position.

Figure 3A:
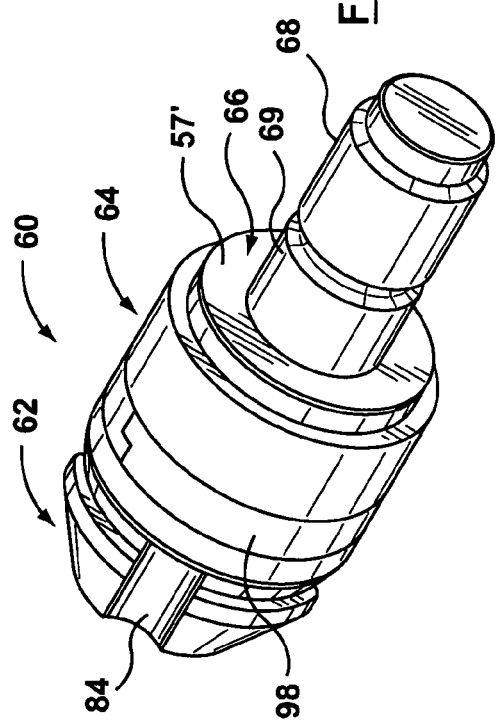
FIGS. 3A, 3B, & 3C are a perspective, front, and section views, respectively, of a non-return valve in accordance with the prior art, the section view is taken along section line A-A of FIG. 3B with the non-return valve configured for injection.
Figure 3C:
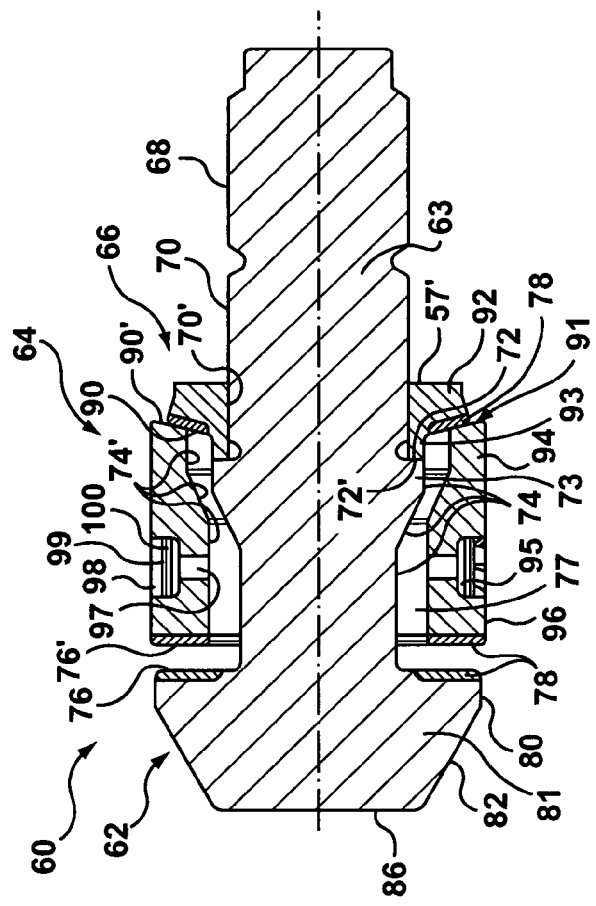
Figure 3B:
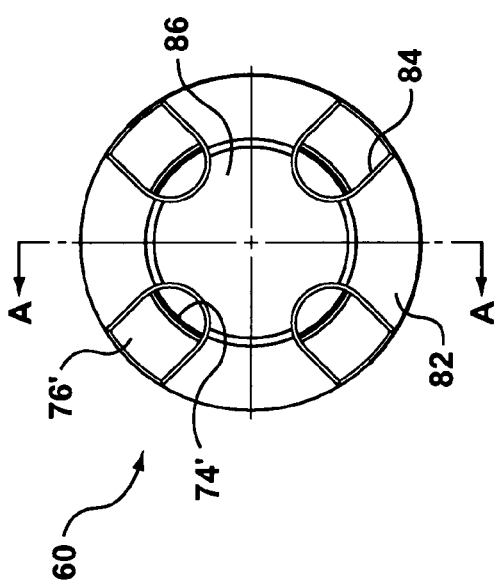
Figure 4A:
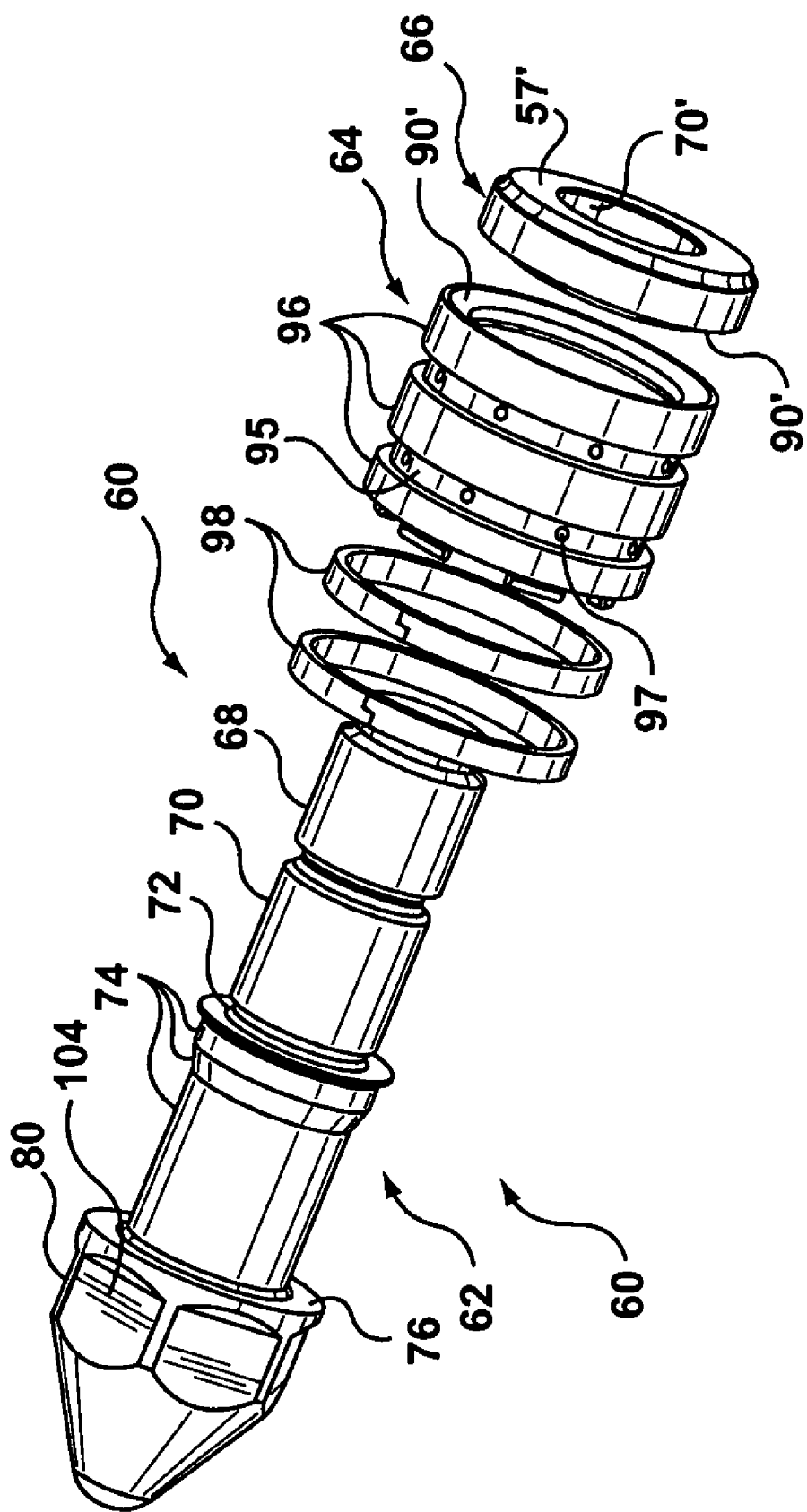
FIGS. 4A, 4B, 4C, & 4D are a perspective, front, and section views, respectively, of a non-return valve in accordance with the prior art, the section views are taken along section line A-A of FIG. 4B with the non-return valve configured for injection and recovery in FIGS. 4C and 4D respectively.
Figure 4D:
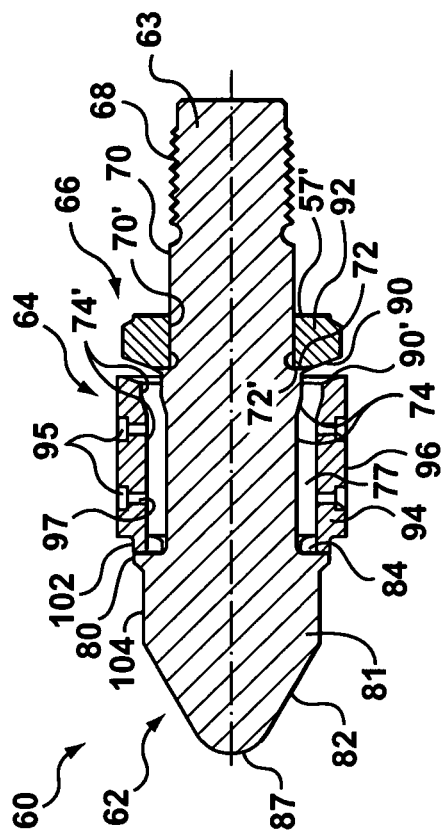
Figure 4C:
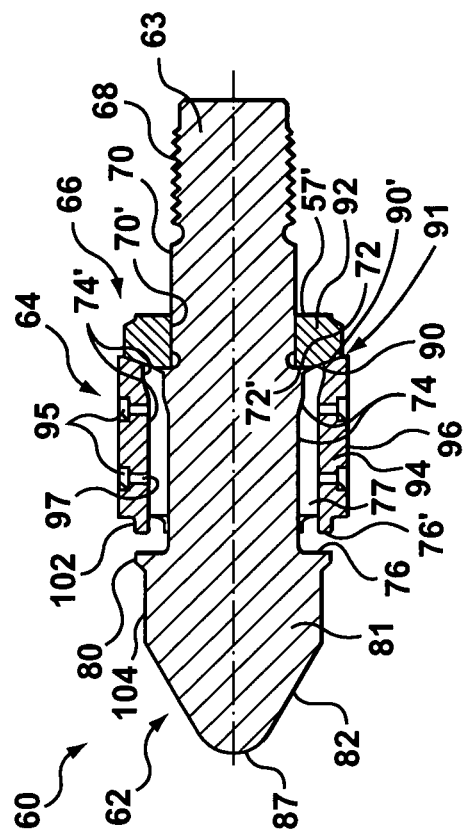
Figure 4B:
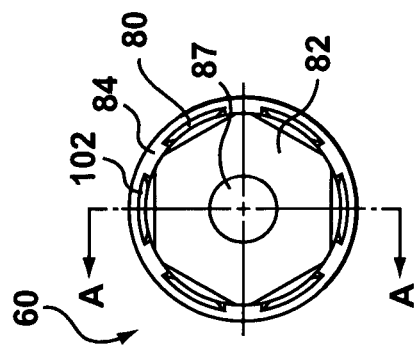

In further detail, the tip member 962 remains essentially unchanged relative to the tip member 62 of the prior art, as shown in FIGS. 3A, 3B, & 3C, except that certain common structural features have assumed the additional functions of aligning and sealing in cooperation with complementary portions provided on the ring member 964. In particular, the tip member 962 includes a spigot flange 973 that is configured similarly to the retaining flange 73 on tip member 62, except that its outer surface is configured to provide the outer aligning-spigot-flow portion 909. Accordingly, an outer circumferential surface of the spigot flange 973 provides a spigot-flow sub-portion, and a tapered front face thereof provides an aligning sub-portion 911.

The ring member 964 is also configured similarly to the ring member 64 of the prior art, as shown in FIGS. 3A, 3B, & 3C, except that the inner circumference of the annular body 94 has been reconfigured to provide the complementary inner aligning-spigot-flow portion 914, and that its outer surface 96 has been configured to cooperate with the barrel bore 48A in a running-fit that may not require the use of a piston ring 98. In particular, a narrow cylindrical band along a rear portion of the inner circumferential surface of the annular body 94 is configured as the inner aligning-spigot-flow portion 914. As before, the inner aligning-spigot-flow portion 914 is configured to cooperate with the complementary outer spigot-flow sub-portion, when the ring member 964 is in the injection position, in an overlapping, mutually parallel, and closely-spaced relation to provide a spigot-seal 122 therebetween. Furthermore, the inner aligning-spigotflow portion 911 is configured to cooperate with the outer aligning sub-portion 911, provided on the tapered front face of the spigot flange 973, to mutually align the ring and tip members 964, 962 as the ring member transitions into the injection position. In particular, any misalignment between the inner aligning-spigot-flow portion 914 and the complementary outer spigot-flow sub-portion 910 will be corrected as the inner aligning-spigot-flow portion 914 is forced to slide along the tapered face of the outer aligning sub-portion 911.

The flange member 366, as described hereinbefore, includes four equiangular-spaced melt inlet grooves 367 that extend through the outer circumferential thereof and between the rear and front faces thereof. Of particular relevance is that the inlet grooves 367 extending through the retaining face 390 preclude a face-seal from being achieved with the complementary rear retaining-sealing face 90 on the ring member 264.

When the ring member 964 is the recovery position, a melt inlet passageway 977A is configured between the complementary retaining-portions 90, 390 that interconnects the melt inlet grooves 367 with a melt transfer passageway 977B formed between the inner circumferential surface of the annular body 94 and the routing portion 920, that extends along the tip member 962 between the spigot flange 973 and the tip flange 81. The tip flange 81 is further configured, as described hereinbefore, to include four melt discharge grooves 84 that cooperate with the melt transfer portion 977B, in use, for the discharge of melt.

With reference to FIGS. 15A, 15B, 15C, & 15D, a non-return valve 1160 in accordance with an alternative embodiment of the present invention is shown that is configured for use in a barrel assembly 38 of an injection molding machine 10. The non-return valve 1160 is very similar to those previously described and shown with reference to FIGS. 5A-5D, and 14A-14D. Accordingly, only the differences in structure and operation between the embodiments will be reviewed and the features that are common to both embodiments have been given similar reference numbers. As before, the non-return valve 1160 includes: a tip member 1062, a ring member 1064, and the flange member 1066.

The non-return valve 1160 is another example of a reconfiguration of the complementary spigot and guiding portions wherein a plug is configured to cooperate with a complementarily configured end portion of an enclosed melt duct flow portion to mutually align therewith and to provide a spigot seal therebetween. Accordingly, plug 1109 has been configured to include an outer spigot-flow sub-portion 1111 and an outer aligning-flow sub-portion 1113, and the melt duct flow portion 1118 has been configured to include an inner aligning-spigot-flow portion 1114. There are a number of the plugs 1109 arranged around a front face of the flange member 1066 and a corresponding number of the enclosed melt duct flow portions 1118 similarly arranged, and that extend through, the ring member 1064. In addition, the ring member 1064 is further configured to include an inner guiding portion 1115 that cooperates with a complementary outer guiding-flow portion 1110 configured along the tip member 1062 for guiding the ring member 1064 between the injection and recovery positions.

In further detail, the tip member 1062 is essentially identical to the tip member 162 of the first embodiment, as shown in FIGS. 5A, 5B, 5C, & 5D except that the outer circumferential surface of the flange 1173 is configured as the outer guiding-flow portion 1110. In addition, when the ring member is in the recovery position, a forward portion of the outer guiding-flow portion 1110 is arranged to cooperate with a number of arcuate routing portions 1119, configured across a front face of the ring member 1064, and the back face of the tip flange 81, for providing melt discharge passageways 1077D that interconnect the melt transfer passageways 1077C, provided along the melt duct flow portions 1118, with the routing portion 1120, provided on the tip member 1062. As before, the routing portion 1120 routes the melt, in use, to melt discharge grooves 84 that are configured along the periphery of the tip flange 81.

The ring member 1064 is also configured similarly to the ring member 964 of the prior embodiment, as shown in FIGS. 14A, 14B, 14C, & 14D. As introduced hereinbefore, the ring member 1064 further includes six cylindrical, equiangular-spaced, longitudinally-aligned melt duct flow portions 1118 arranged between the front and back face thereof and in-between the inside and outside circumferential surfaces of the annular body 94. A cylindrical rear portion of each melt duct flow portion 1118 is further configured to provide the inner aligning-spigot-flow portion 1114 that cooperates, in use, with the plugs 1109 as will be explained hereinafter. As introduced hereinbefore, the front face of the ring member 1064 is further configured to include four equiangular-spaced, arcuate grooves that provide routing portions 1119 for interconnecting the end portions of adjacently paired melt duct flow portions 1118. The grooves are further characterized in that they extend through the inner circumferential surface of the ring member 1064 for interconnecting the arcuate routing portions 1119 with the routing portion 1120, when the ring member is in the recovery position, and as described hereinbefore.

Figure 5A:
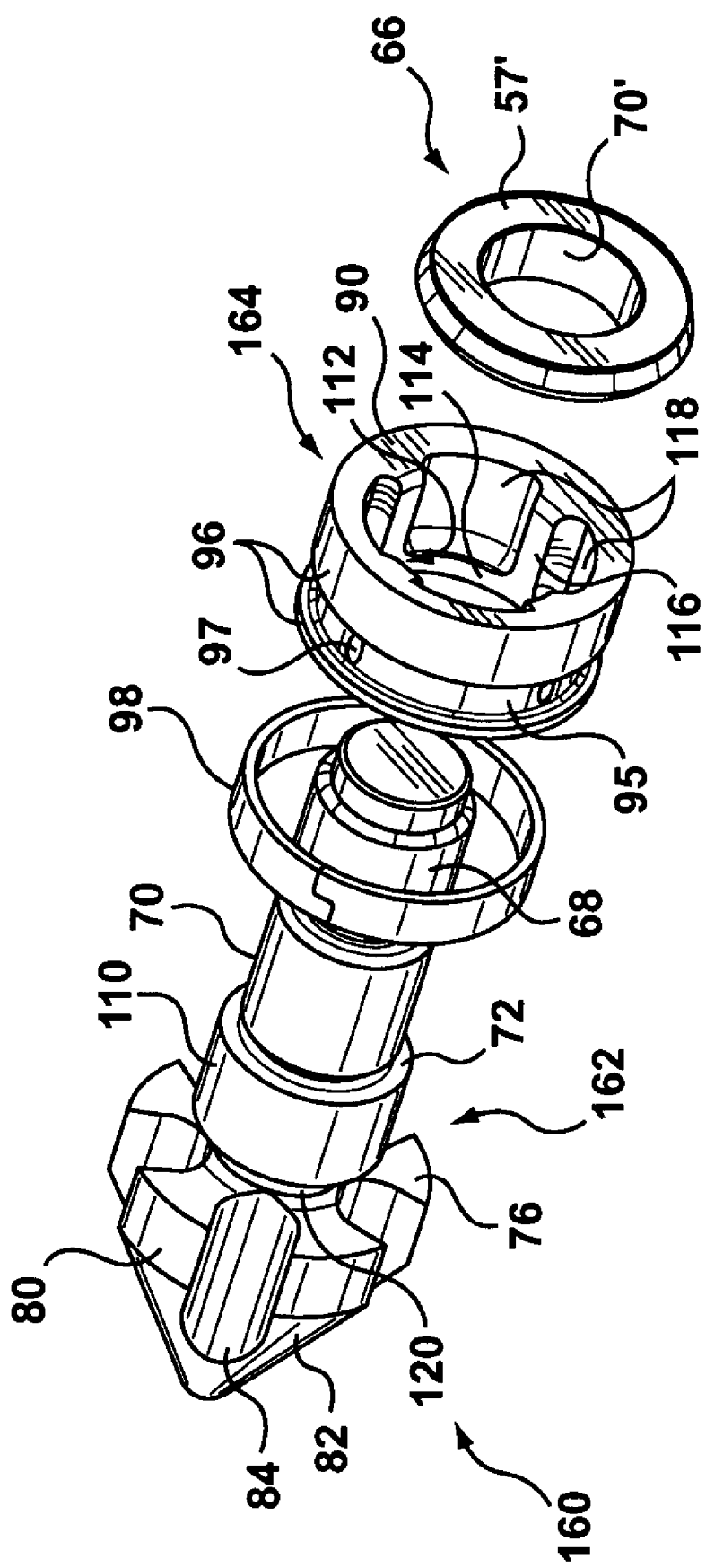
Figure 6A:
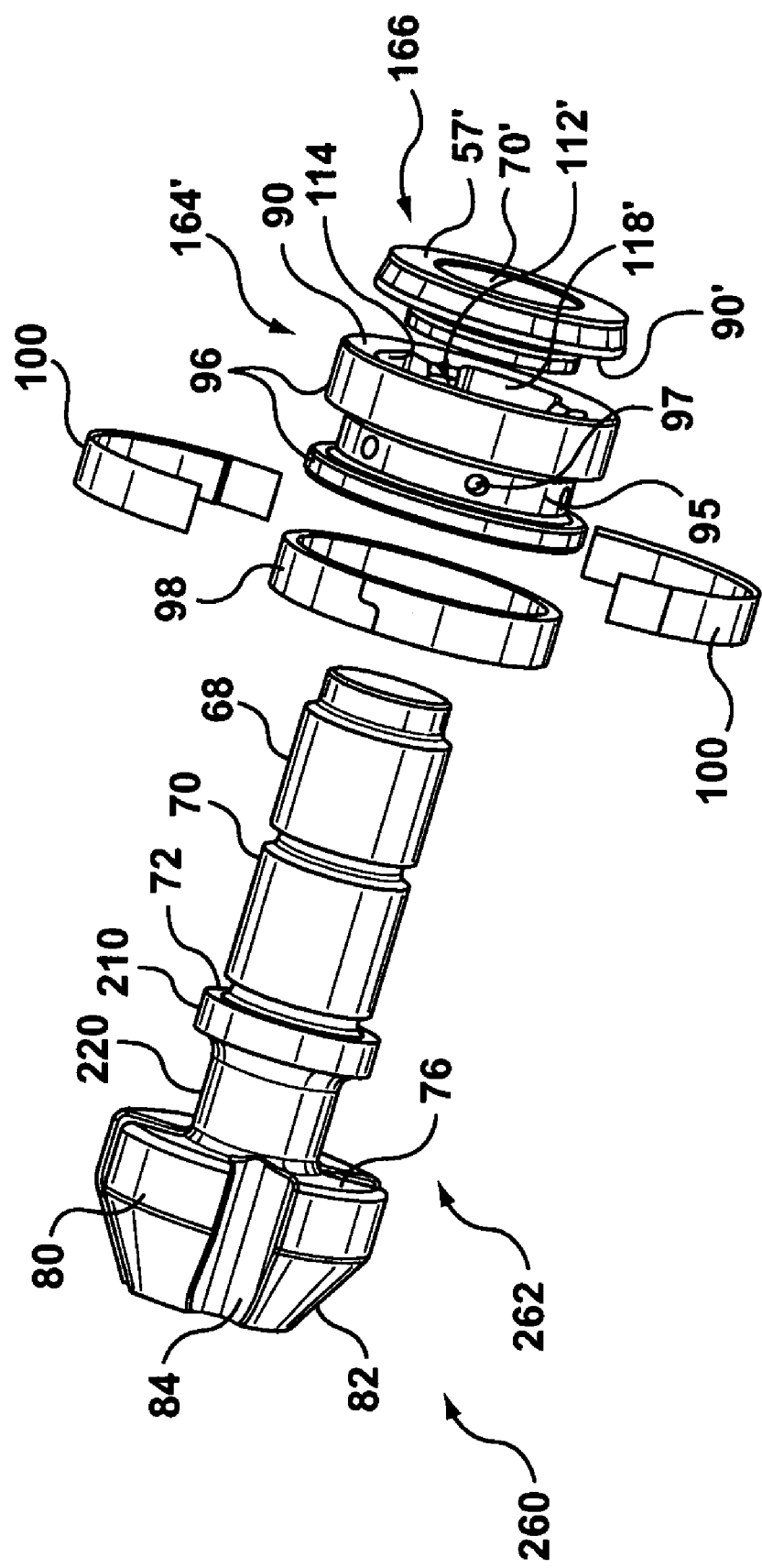
Figure 7A:
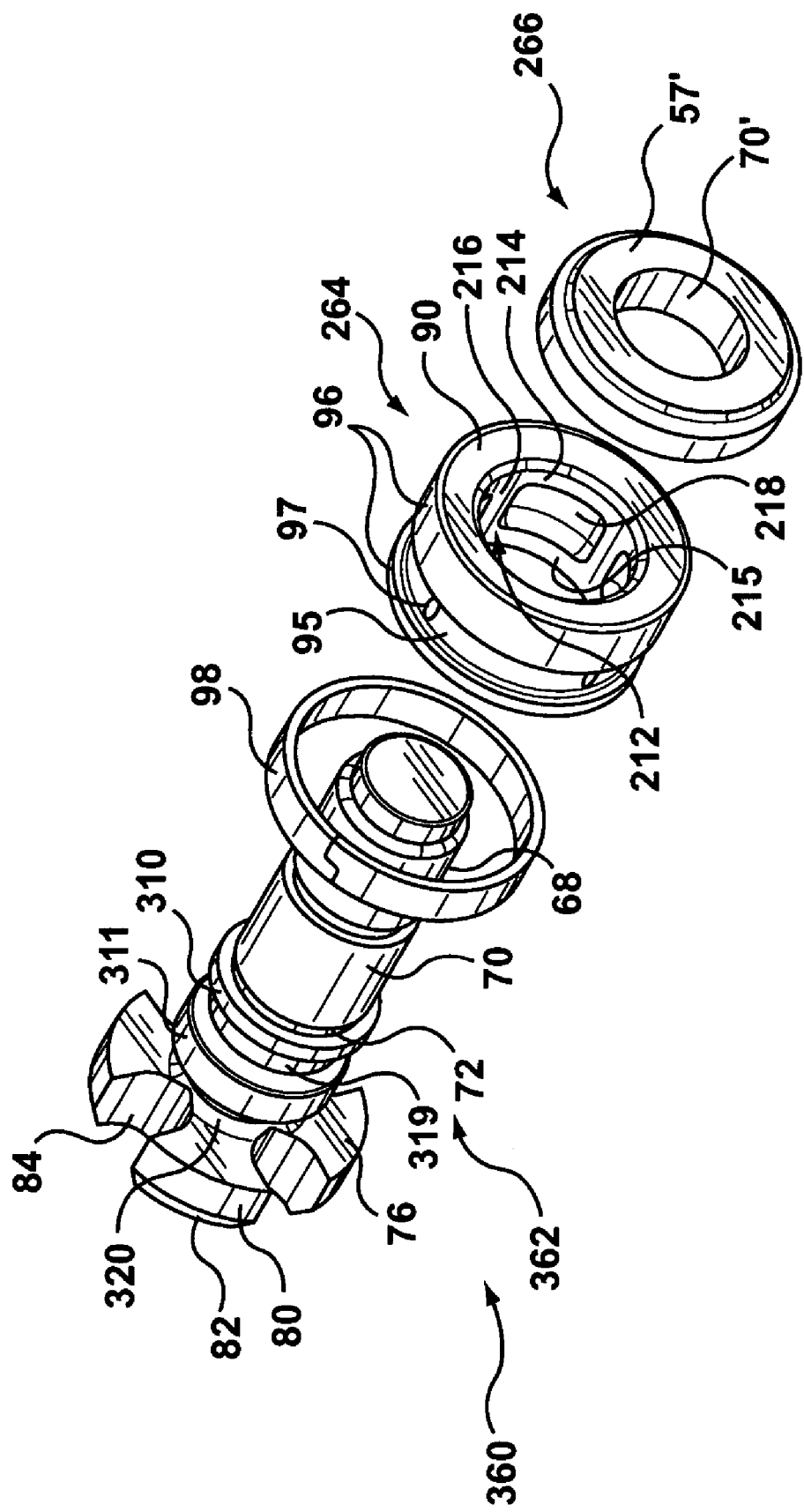
FIGS. 7A, 7B, 7C, & 7D are a perspective, front, and section views, respectively, of a non-return valve in accordance with an alternative embodiment of the present invention, the section views are taken along section line A-A of FIG. 7B with the non-return valve configured for injection and recovery in FIGS. 7C and 7D respectively.
Figure 7C:
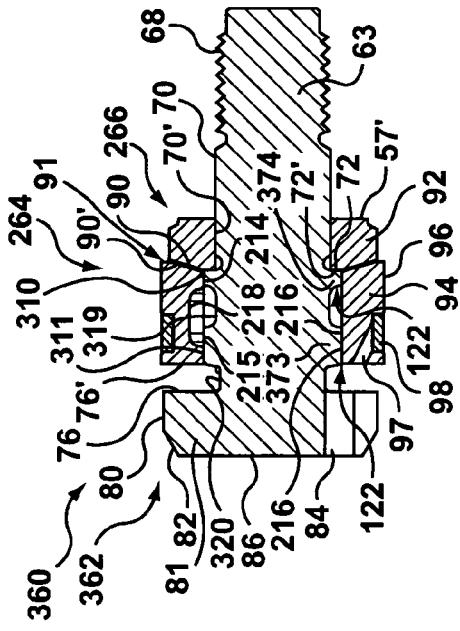
Figure 7D:
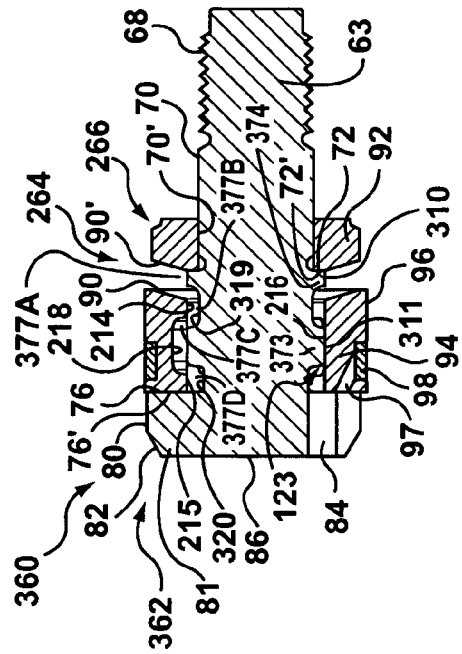
Figure 7B:
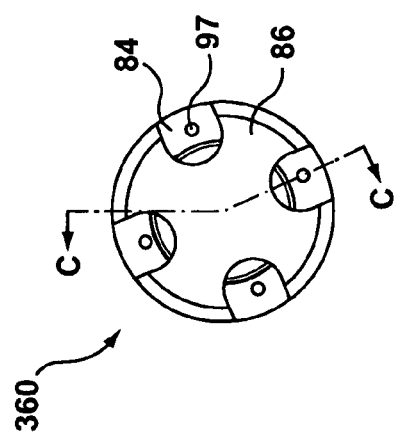
Figure 8A:
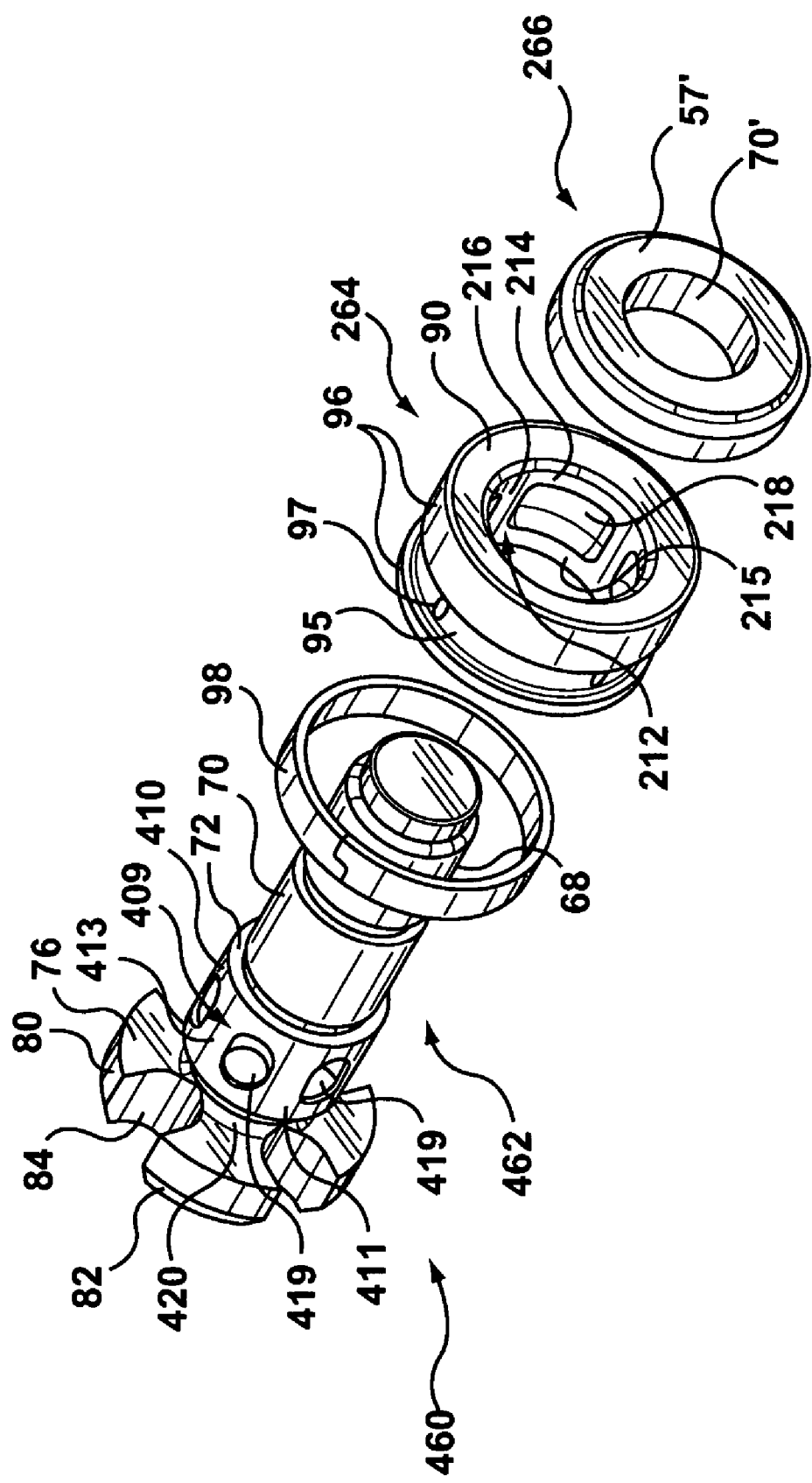
FIGS. 8A, 8B, 8C, & 8D are a perspective, front, and section views, respectively, of a non-return valve in accordance with an alternative embodiment of the present invention, the section views are taken along section line A-A of FIG. 8B with the non-return valve configured for injection and recovery in FIGS. 8C and 8D respectively.
Figures 8B, 8C, 8D:
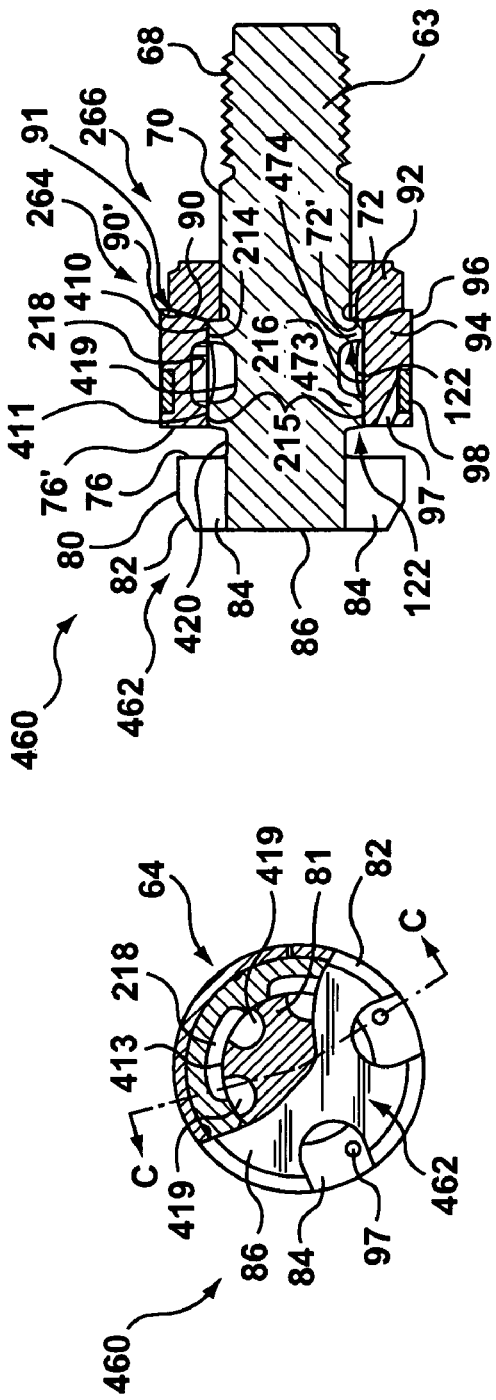
Figure 9A:
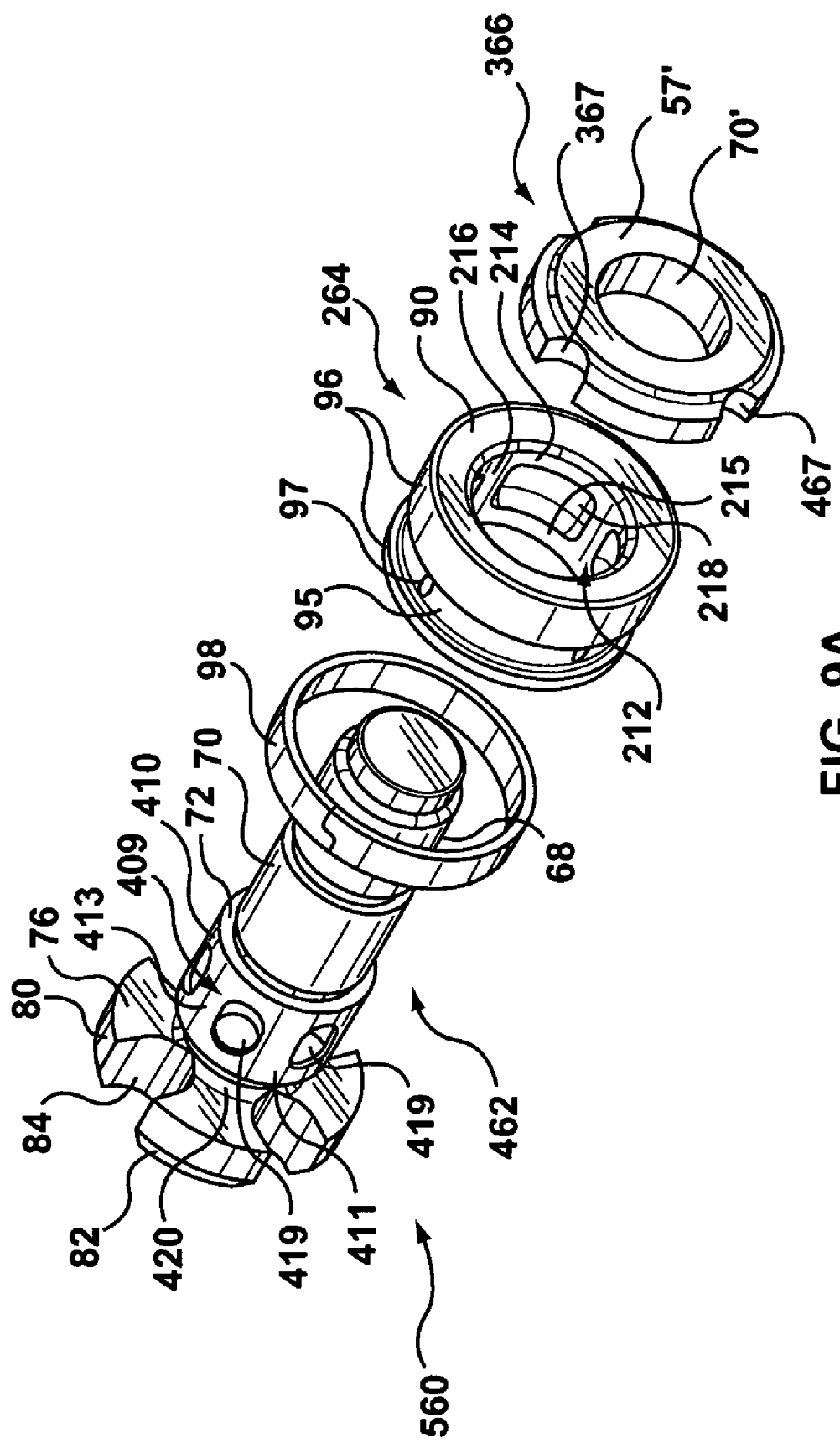
Figure 10A:
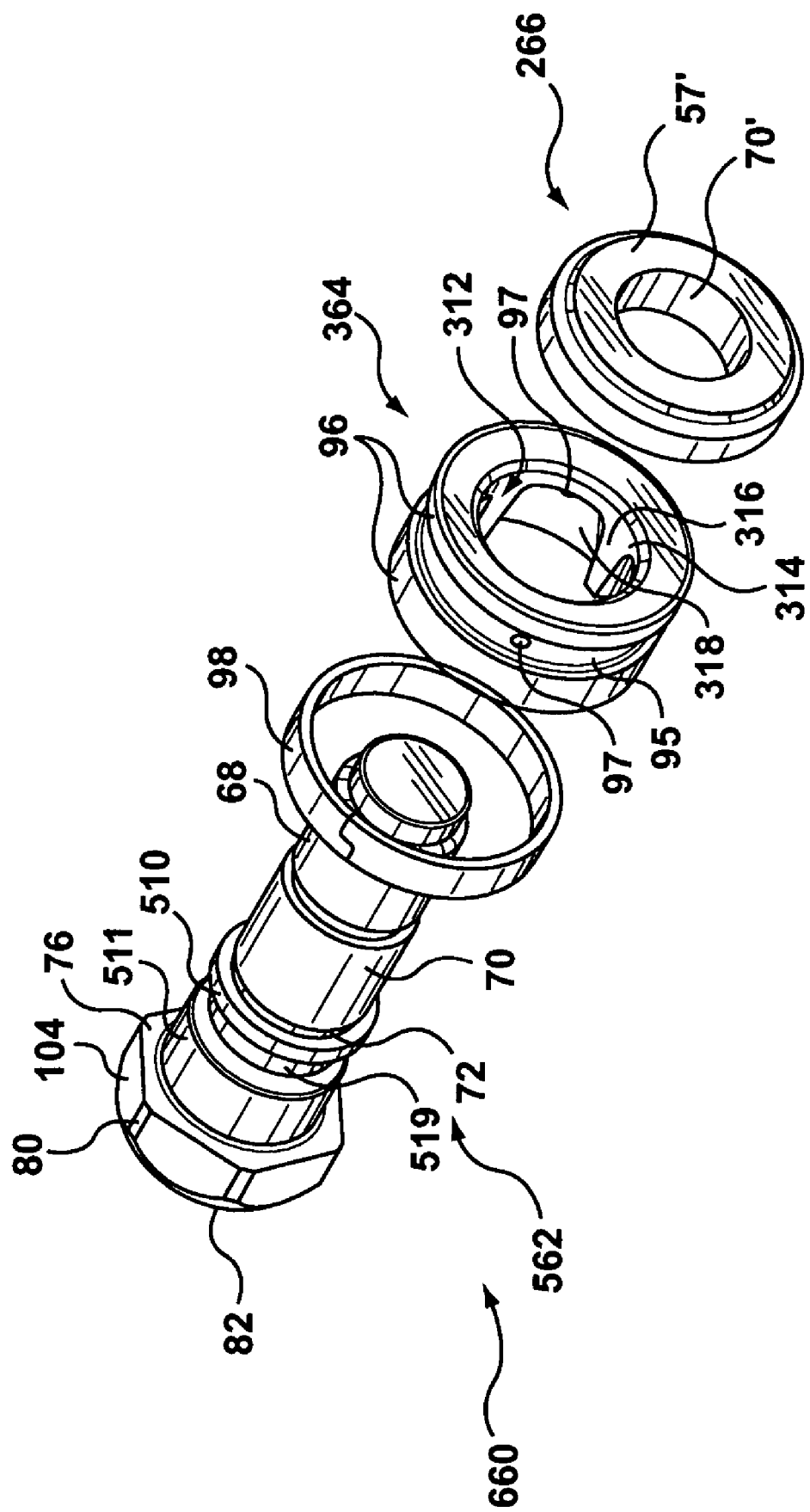
Figure 11A:
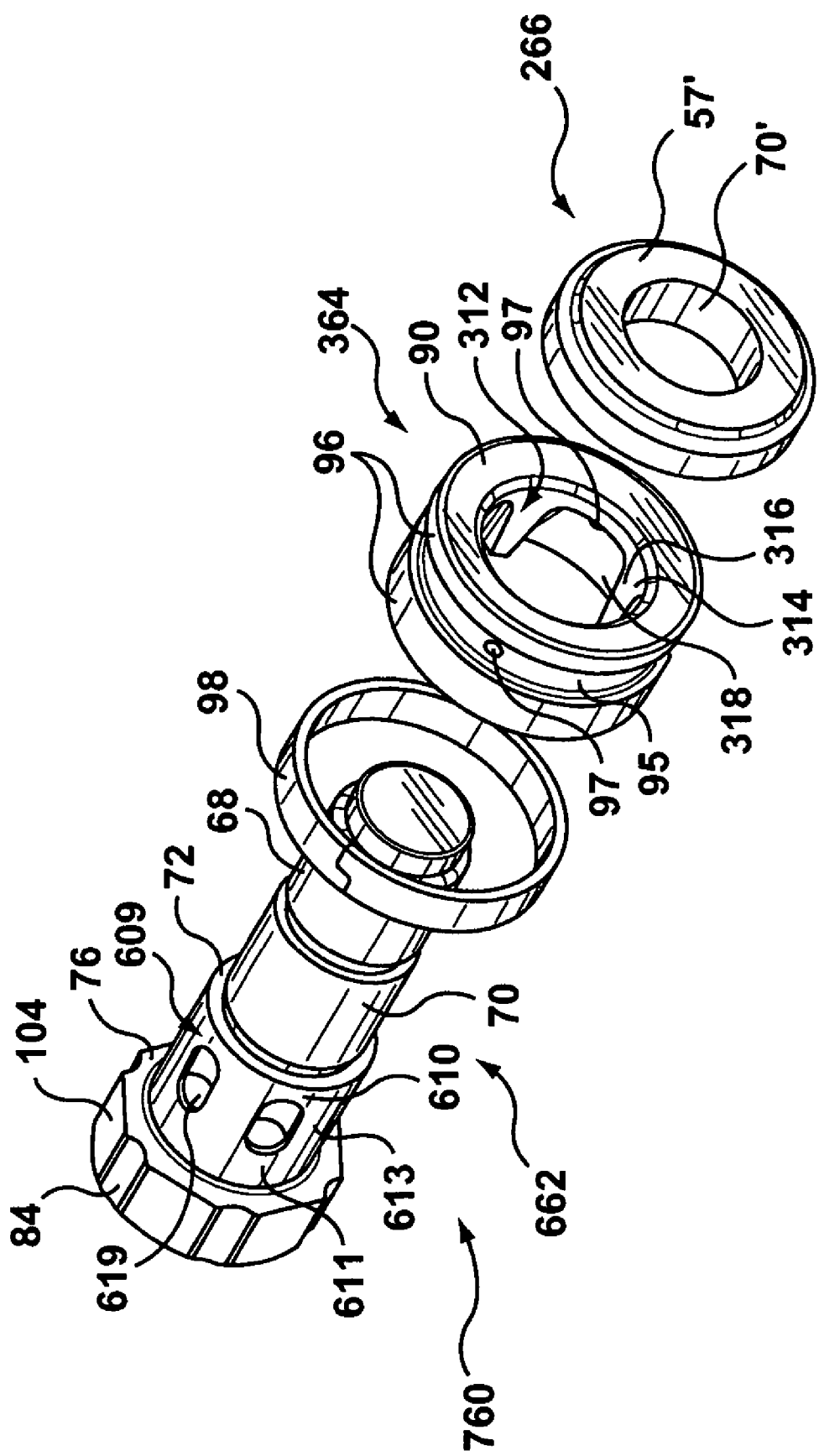
Figure 12A:
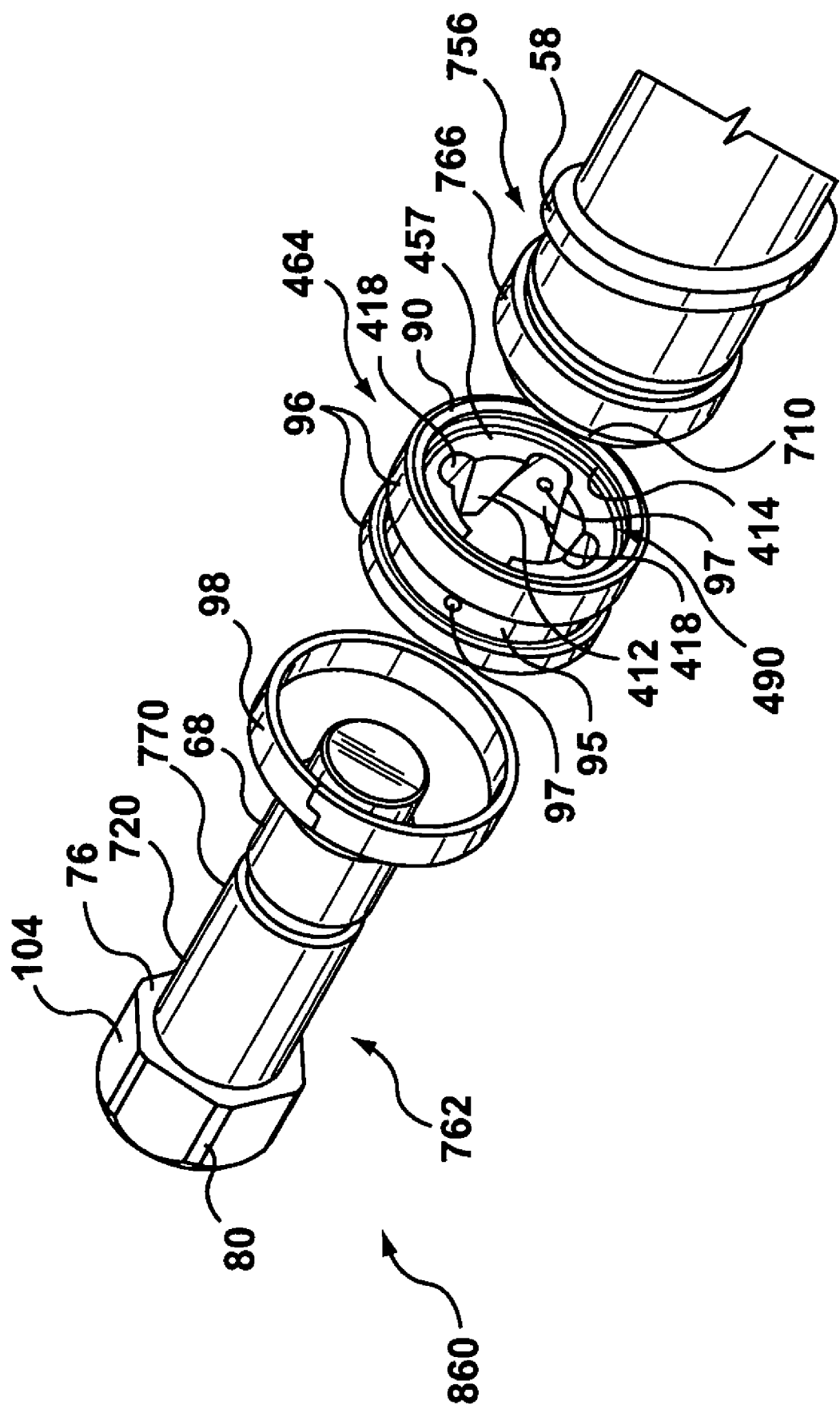
Figure 13A:
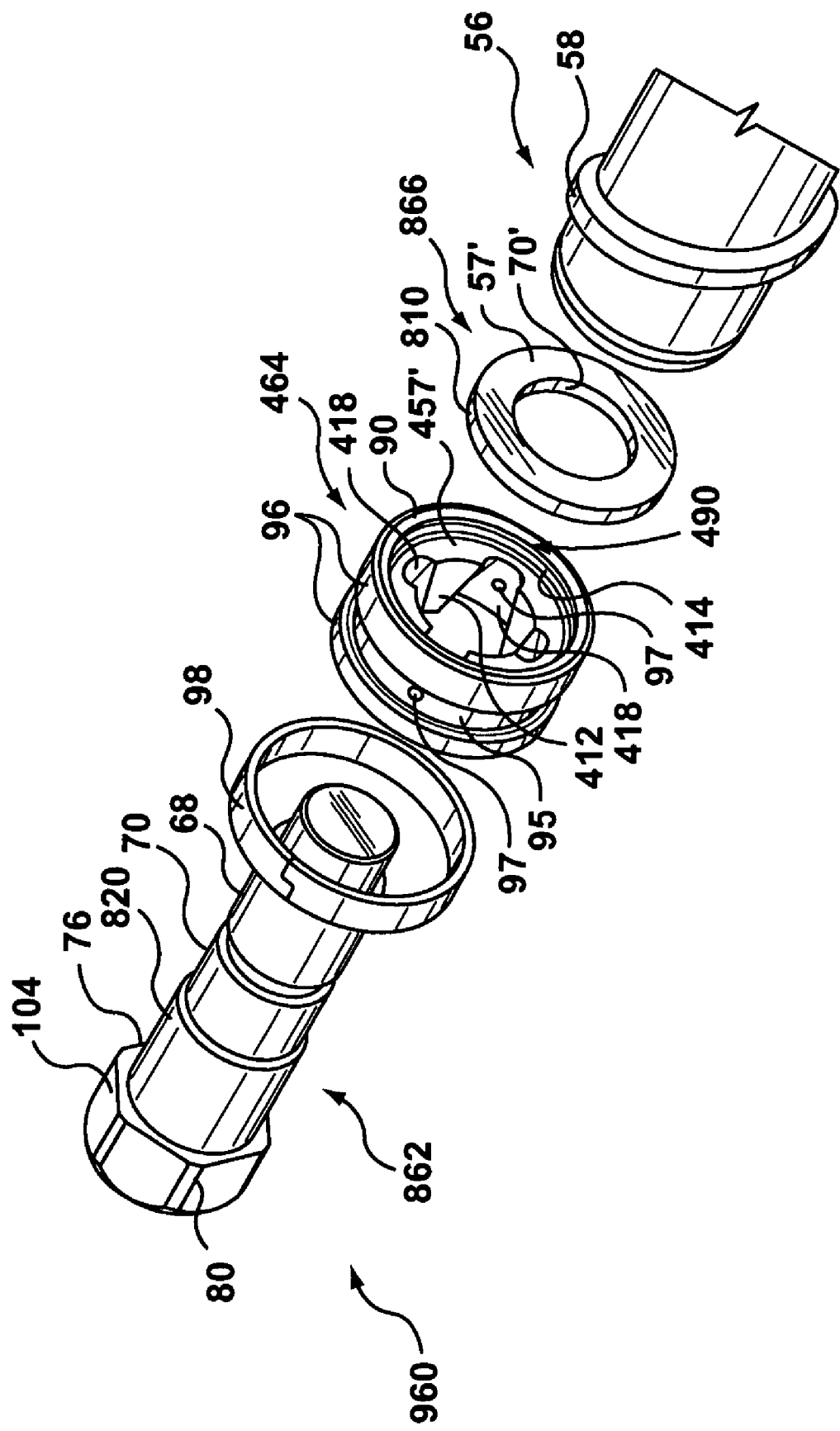
FIGS. 13A, 13B, 13C, & 13D are a perspective, front, and section views, respectively, of a non-return valve in accordance with an alternative embodiment of the present invention, the section views are taken along section line A-A of FIG. 13B with the non-return valve configured for injection and recovery in FIGS. 13C and 13D respectively.
Figure 13C:
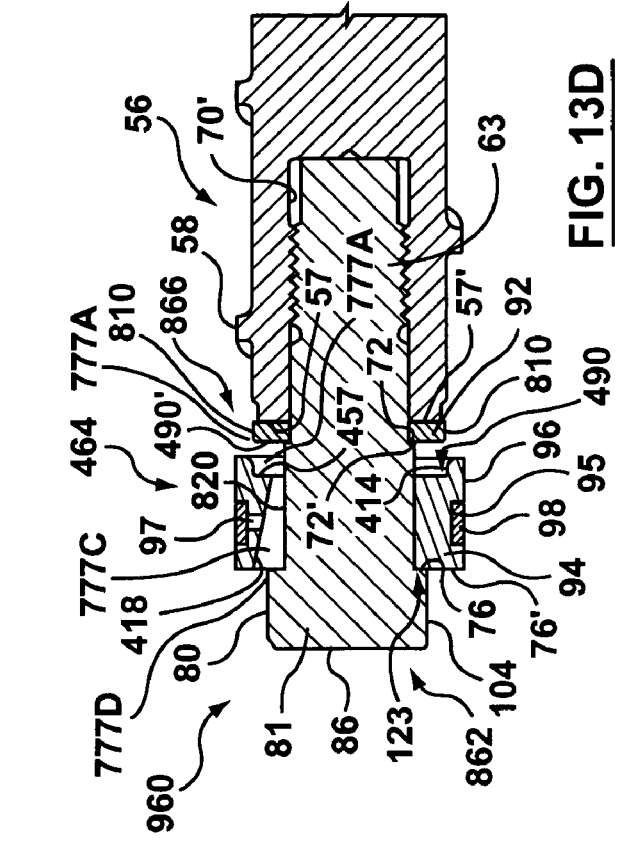
Figure 13D:
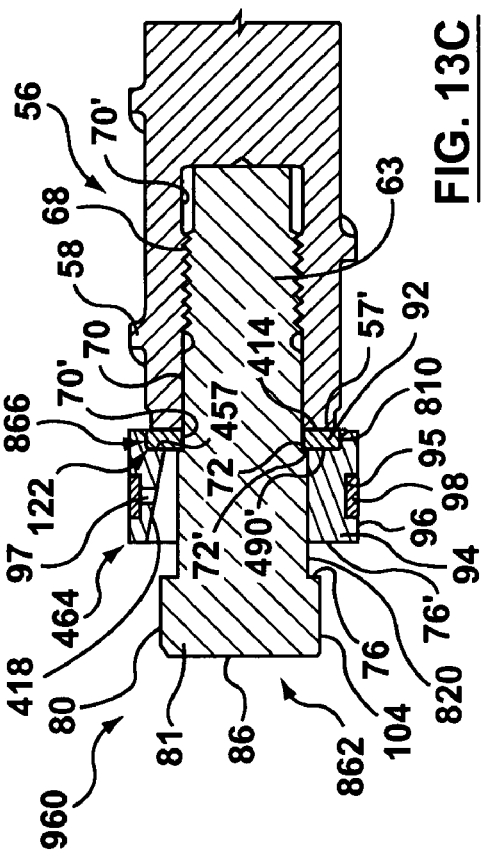
Figure 13B:
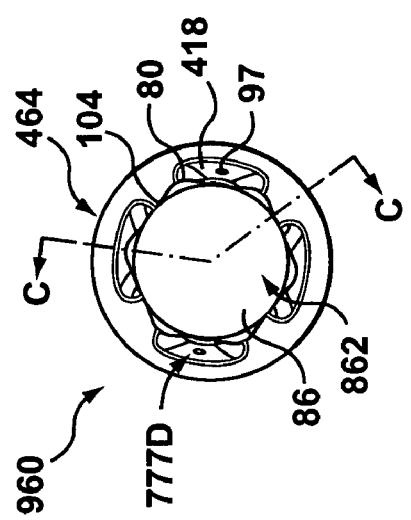
Figure 14A:
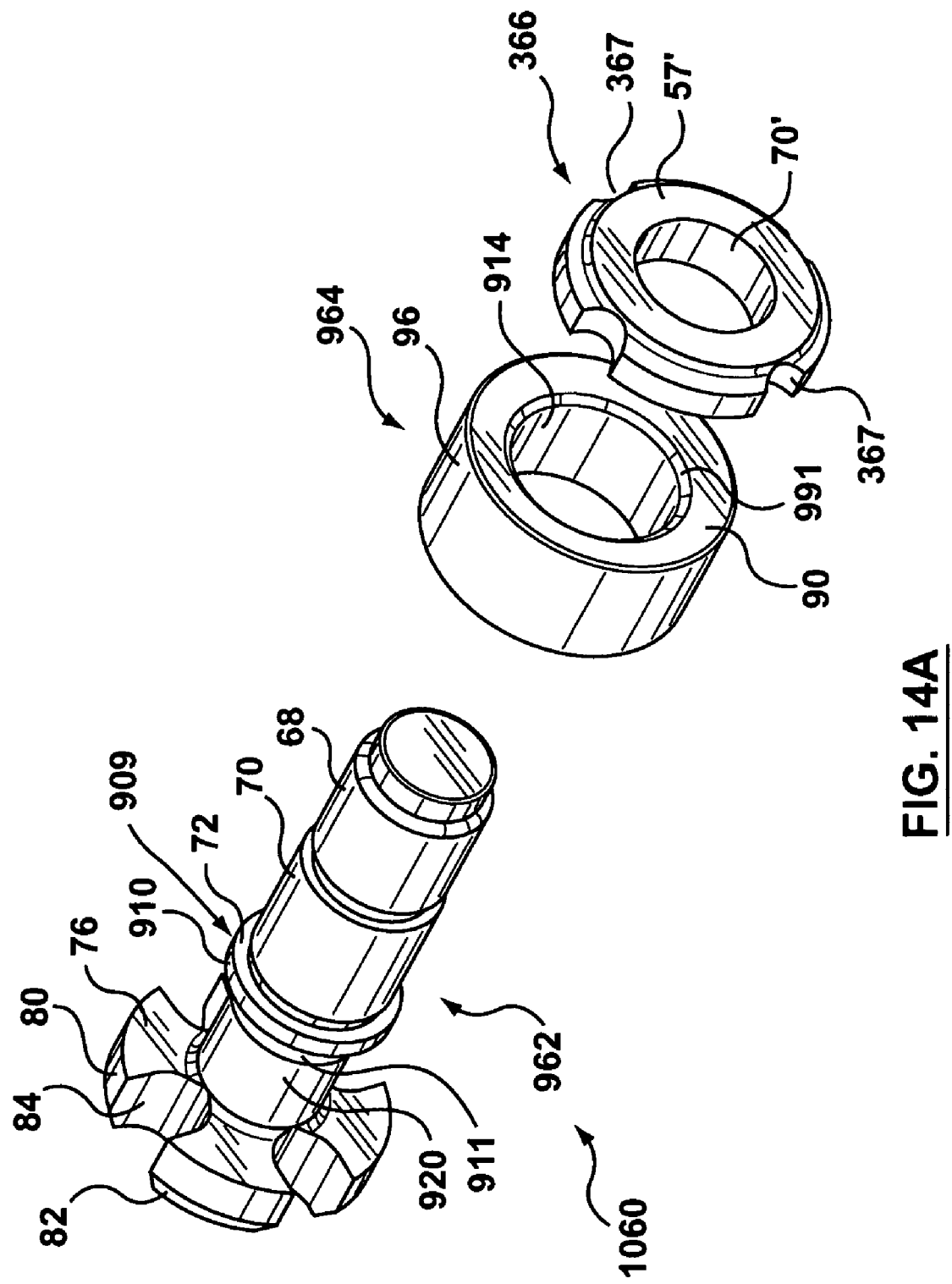
Figure 15A:
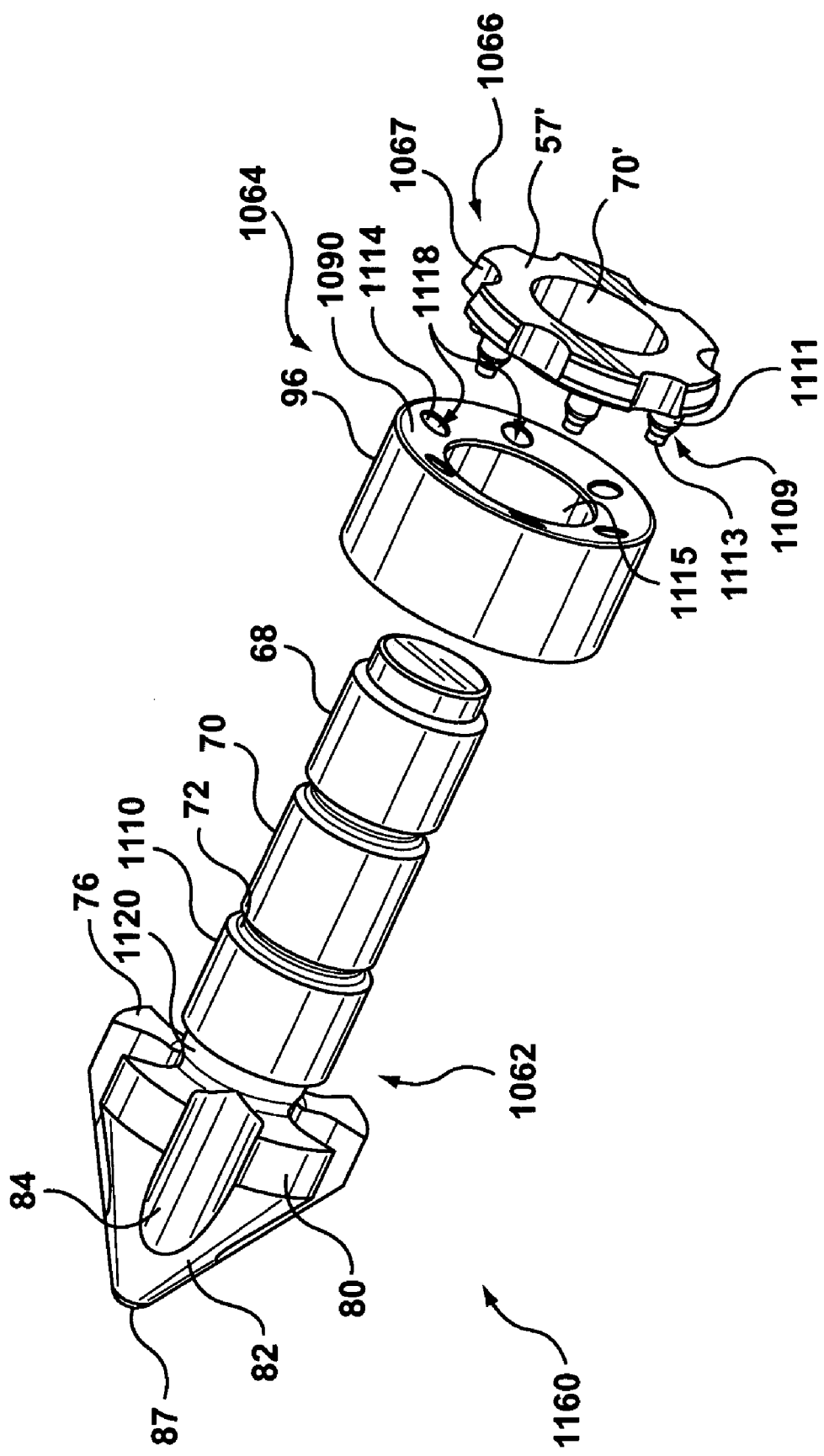

The flange member 1066 is also configured similarly to the flange member 66 of the first embodiment, as shown in FIGS. 5A, 5B, & 5C. As introduced hereinbefore, the flange member 1066 further includes six cylindrical, equiangular-spaced, longitudinally-aligned plugs 1109 that are arranged to protrude from a front face thereof in a pattern that corresponds to that of the complementary melt duct flow portions 1118, provided along the ring member 1064. The configuration of each plug 1109 is further characterized in that it has a rear cylindrical portion, a much narrower, longitudinally-aligned forward cylindrical portion, and a transition portion therebetween. The outer circumference surface of the rear cylindrical portion provides the outer spigot-flow sub-portion 1111. As before, the outer spigot-flow portion 1111 is configured to cooperate with the complementary inner aligning-spigot-flow portion 1114, when the ring member 1064 is in the injection position, in an overlapping, mutually parallel, and closely-spaced relation to provide a spigot-seal 122 therebetween. Similarly, the outer circumferential surface of the forward cylindrical portion and the transition portion provide the outer aligning-flow sub-portion 1113. The outer aligning-flow sub-portion 1113 is configured to cooperate with the inner aligning-spigot-flow sub-portion 1114 to mutually align the plugs 1109 with the melt duct flow portions 1118 as the ring member 1064 transitions into the injection position. In particular, any misalignment between the inner aligning-spigot-flow portion 1114 and the complementary outer spigot-flow sub-portion 1111 will be corrected as the inner aligning-spigot-flow portion 1114 is forced to slide along the shaped outer aligning-flow sub-portion 1113. With reference to FIG. 15C, the forward cylindrical portion of the plugs 1109 remain engaged within the end of each melt duct flow portion 1118 to maintain general alignment therebetween when the ring member is in the recovery position. Furthermore, the annular space between the outer alignment-flow sub-portion 1113 and the complementary inner alignment-spigot-flow portion 1114 provides a melt transition passageway that interconnects a melt inlet passageway 1077A with the melt transition passageway 1077C.

The other differences in the configuration of the flange member 1066 are not particularly relevant to the present invention and are merely illustrative of other possible variations. In particular, the flange member 1066 further includes four shallow, equiangular-spaced melt inlet grooves 1067. The configuration of the inlet grooves 1067 does not preclude achieving a face seal 91 between the complementary retaining-sealing portions 1090, 1091'. However, the face-seal 91 is considered to be supplemental and accordingly is not a required feature.

While the spigot-seal has been characterized hereinbefore as preferably including a small gap between the complementary spigot portions, it is recognized that the resulting seal may also be achieved with no gap or even with a moderate interference-fit therebetween. The foregoing may require a modest tapering of the complementary spigot portions or some other means for their initial mutual engagement.

Of course, other workshop variations may include: the flange member integrally formed with the tip portion; the tip and flange members integrally formed at the end of the screw; the tip member includes a detachable tip flange 81 for ease of servicing the ring member.

Notwithstanding the fact that the various embodiments of the non-return valve of the present invention, described hereinbefore, have been configured for use within a barrel assembly 38 of an injection molding machine 10, no such limitation is implied as to its general utility. For example, the non-return valve of the present invention may be alternately configured for use: anywhere along the molding material flow path (e.g. in an hot runner nozzle assembly, in a hot runner shooting pot assembly, etc.); in other types of molding systems (e.g. extrusion molding, die casting, etc.); in molding other classes of molding materials (e.g. thermoplastics); in molding using an alternate molding process (e.g. fully liquid melt).

All U.S. and foreign patent documents discussed above are hereby incorporated by reference into the Detailed Description of the Presently preferred embodiment.

The individual components shown in outline or designated by blocks in the attached Drawings are all well-known in the molding arts, and their specific construction and operation are not critical to the operation or best mode for carrying out the invention.

While the present invention has been described with respect to what is presently considered to be the presently preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A non-return valve for use in a flow channel of a metal molding system, the non-return valve comprising:
   a tip member;
   a ring member configured to be slidably arranged around a portion of the tip member for a travel between an open and a closed position the tip member and the ring member being configured to cooperate with a flange member for limiting the travel of the ring member;
   a melt passageway being configurable along the non-return valve when the ring member is arranged in an open position, the melt passageway including:
      a complementary pair of spigot portions that are configured along any combination of: i) the tip member, (ii) the ring member, and (iii) the flange member, the complementary pair of spigot portions being configured to cooperate in a substantially closely-spaced, overlapping, and parallel arrangement when the ring member is arranged in the closed position to provide a spigot-seal to substantially block a backflow of a metallic melt through the non-return valve, the spigot-seal maintaining an effective backflow restriction even in an eventuality of transient movement between the complementary pair of spigot portions during injection of the metallic melt; and
   a pair of complementary retaining-sealing portions being configured on parallel faces provided on the rear of the ring member and the front of the flange member, whereby a face-seal is configurable therebetween when the non-return valve is in the closed position to assist in blocking the backflow of melt flow through the melt passageway,
   wherein:
   the tip member includes a spigot flange,
   the complementary pair of spigot portions are configured along a portion of an outer circumferential surface of the spigot flange, and along a portion of an inner circumferential surface of the ring member, and
   the melt passageway further includes:
      a transfer portion disposed on an inner surface of the ring member.

2. The non-return valve in accordance with claim 1, further comprising:
   a complementary pair of guiding portions that are disposed between the tip member and the ring member for guiding the ring member in coaxial alignment with the tip member as it translates between the open position and the closed position.

3. The non-return valve in accordance with claim 1, wherein the complementary pair of spigot portions are further configured for guiding the ring member in coaxial alignment with the tip member as it translates between the open position and the closed position.

4. The non-return valve in accordance with claim 1, wherein the complementary pair of spigot portions are further configured for mutually aligning the ring member and the tip member with the closing of the non-return valve.

5. The non-return valve in accordance with claim 1, wherein the tip member and the ring member are configured to cooperate in a running-fit as the ring member travels between the open and the closed position.

6. The non-return valve in accordance with claim 1, wherein the melt passageway further comprises:
   a groove disposed on the outer surface of the tip member.

7. The non-return valve in accordance with claim 6, wherein the groove extends circumferentially around the tip member.

8. The non-return valve in accordance with claim 6, wherein the groove includes:
   a plurality of the grooves being disposed through the outer circumferential surface of the flange member in an equiangular-spaced relation.

9. The non-return valve in accordance with claim 6, wherein the groove provides at least one of a routing portion, and the transfer portion of the melt passageway, and any combination thereof.

10. The non-return valve in accordance with claim 6, wherein the groove includes:
   a plurality of grooves being disposed in an equiangular-spaced relation around the inner surface of the ring member.

11. The non-return valve in accordance with claim 1, wherein the complementary pair of spigot portions are disposed adjacent the pair of complementary retaining-sealing portions.

12. The non-return valve in accordance with claim 1, wherein the flange member includes a melt inlet groove configured between a rear and front surfaces thereof.

13. The non-return valve in accordance with claim 1, wherein the flange member includes an outer circumferential surface that is configured for providing one of the complementary pair of spigot portions.

14. The non-return valve in accordance with claim 1, wherein the flange member is configured on an end of a screw.

15. The non-return valve in accordance with claim 1, wherein one of the complementary pair of spigot portions is configured along an inner surface of a melt duct that is arranged between an inner and an outer surface of the ring member, and wherein the other one of the complementary pair of spigot portions is provided on an outer circumferential surface of a plug that is arranged on the flange member.

16. The non-return valve in accordance with claim 15, wherein the melt duct extends through the ring member.

17. The non-return valve in accordance with claim 15, wherein there are a plurality of melt ducts and plugs in an equiangular-spaced, longitudinally-aligned arrangement around the ring member and the flange member, respectively.

18. The non-return valve in accordance with claim 17, wherein a distal end of each of the plurality of melt ducts is interconnected by at least one groove that is configured through the inner surface of said ring member adjacent a distal end thereof.

19. The non-return valve in accordance with claim 15, wherein the plug also includes a forward portion that is configured to remain engaged within an inlet end of the melt duct to maintain general alignment therebetween.

20. The non-return valve in accordance with claim 1, wherein the ring member further includes:
   a groove around an outer surface thereof for receiving a piston ring.

21. The non-return valve in accordance with claim 20, further comprising:
   a pressure port extending between the melt passageway and the groove of the piston ring.

22. The non-return valve in accordance with claim 21, wherein the groove is further configured for receiving a sub-ring beneath the piston ring.

23. A barrel assembly including the non-return valve in accordance with any of claims 1 through 22.

24. A metal injection molding machine including the barrel assembly of claim 23.

* * * * *